US00RE41447E

(19) United States
(12) Reissued Patent
Tiana

(10) Patent Number: US RE41,447 E
(45) Date of Reissued Patent: Jul. 20, 2010

(54) IMAGE FUSION SYSTEM AND METHOD

(75) Inventor: Carlo Tiana, Portland, OR (US)

(73) Assignee: BAE Systems Controls, Inc., Johnson City, NY (US)

(21) Appl. No.: 11/409,545

(22) Filed: Apr. 20, 2006

Related U.S. Patent Documents

Reissue of:
(64) Patent No.: 6,898,331
Issued: May 24, 2005
Appl. No.: 10/229,574
Filed: Aug. 28, 2002

(51) Int. Cl.
*G06K 9/40* (2006.01)
*G06K 9/36* (2006.01)
*G09G 5/00* (2006.01)
*H04N 9/74* (2006.01)

(52) U.S. Cl. ..... 382/274; 382/282; 382/284; 345/617; 348/584

(58) Field of Classification Search ..... 382/274, 382/284, 282, 154, 173; 345/617, 629, 630; 348/584
See application file for complete search history.

(56) References Cited

U.S. PATENT DOCUMENTS 4,661,986 A 4/1987 Adelson
4,674,125 A 6/1987 Carlson et al.
5,325,449 A 6/1994 Burt et al.
5,510,772 A * 4/1996 Lasenby ..... 340/578
5,686,960 A 11/1997 Sussman et al.
5,778,108 A * 7/1998 Coleman, Jr. ..... 382/305
5,881,163 A * 3/1999 Slump et al. ..... 382/154
6,137,498 A 10/2000 Silvers
6,163,309 A 12/2000 Weinert
6,201,899 B1 3/2001 Bergen
6,208,766 B1 * 3/2001 Schweyer et al. ..... 382/274
6,320,979 B1 11/2001 Melen
6,898,331 B2 5/2005 Tiana
2002/0025154 A1 * 2/2002 Nonaka ..... 396/106

OTHER PUBLICATIONS

European Search Report dated Aug. 31, 2007 for European Patent Application No. 03751927.

(Continued)

*Primary Examiner*—Wesley Tucker
(74) *Attorney, Agent, or Firm*—Christie, Parker & Hale, LLP.

(57) ABSTRACT

A contrast-based image fusion system and method of processing multiple images to form a processed or fused image including regions selected from one or more images. Images are divided into image regions. Portions of the images are filtered if necessary. A contrast map is generated for each image via a convolution kernel resulting in a contrast map with contrast values for each image region. Contrast values are compared and image regions are selected based on a selection criteria or process such as greater or maximum contrast. The selected image regions form the fused image. If necessary, the luminance of one or more portions of the fused image is adjusted. One sensor is selected as a reference sensor, and an average intensity of each region of the reference sensor image is determined across the reference sensor image. The intensity of one or more regions in the final image is adjusted by combining the determined average luminance values and intensity values of the final image.

119 Claims, 21 Drawing Sheets

OTHER PUBLICATIONS

Aggarwal M., et al., Split Aperture Imaging for High Dynamic Range. Proceedings of the Eight IEEE International Conference on Computer Vision. (ICCV). Vancouver. British Colombia. Canada. Jul. 7–14, 2001, International Conference on Computer Vision, Los Alamitos, California. IEEE Comp Soc. US, vol. 1 of 2, Conf. 8, Jul. 7, 2001 (2001–07–07), pp. 10–17, XP010554063. ISBN 0–7695–1143–0.

Pohl, C., et al.; Multisensor Image Fusion in Remote Sensing: Concepts, Methods and Applications. International Journal of Remote Sensing. Basingstoke, Hants, GB. vol. 19, No. 5. Mar. 20, 1998 (1998–03–20), pp. 823–854, XP008044449.

Peli, T., et al.; Multi–Spectral Image Fusion for Visual Display. Proceedings of the SPIE—The International Society for Optical Engineering SPIE–Int. Soc. Opt. Eng. USA, vol. 3719. 1999. pp. 359–368. XP002448553, ISSN: 0277–786X.

PCT International Search Report, Intl. Appln. No. PCT/US03/27046, Jan. 20, 2004.

* cited by examiner

500

510

520

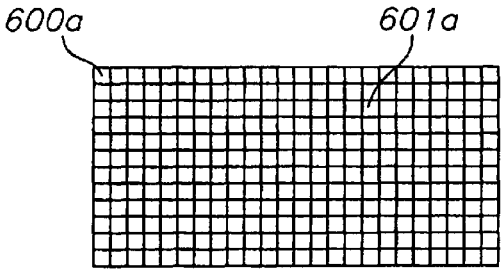
FIG. 6A
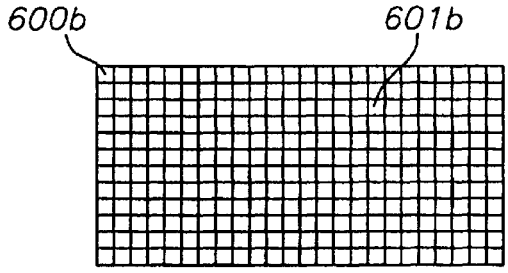
FIG. 6B
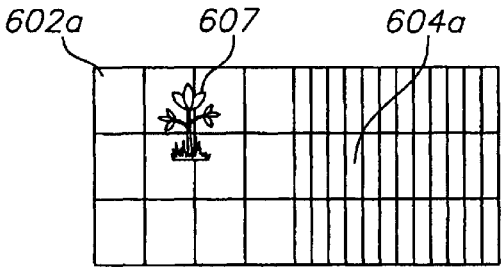
FIG. 6C
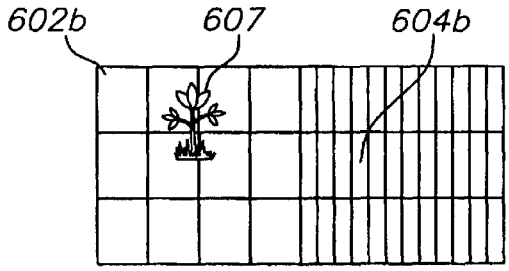
FIG. 6D
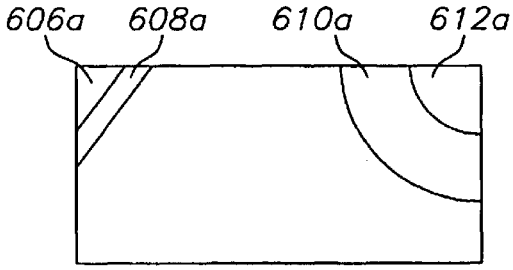
FIG. 6E
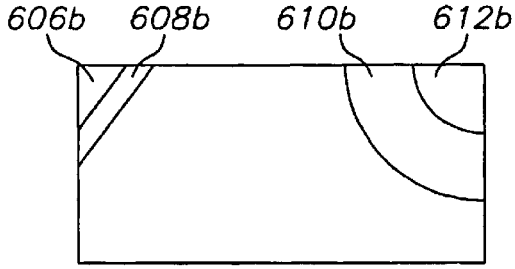
FIG. 6F
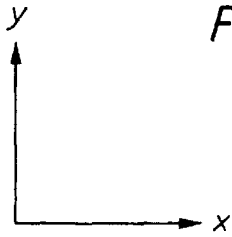

1100

1110

1400
1402
1404
1406
1410
1412
1414
1416
1420
1430
1432
1434
1436
1440
1442
1444
1446
1450

IMAGE FUSION SYSTEM AND METHOD

Matter enclosed in heavy brackets [ ] appears in the original patent but forms no part of this reissue specification; matter printed in italics indicates the additions made by reissue.

FIELD OF THE INVENTION

The present invention relates generally to imaging systems and methods, and more particularly, to an imaging system and method that selectively fuse or combine regions of images from two or more sensors to form a single, processed image.

DESCRIPTION OF RELATED ART

Image fusion generally refers to combining or merging portions of two or more images into a single processed image. Image fusion is commonly used when two or more detectors are used in generating an image, whereby the image displayed to a user or provided to an automated processing system is combined from information provided by each of the sensors.

One manner in which known systems combine images from different sensors is by merely adding the two images together on a pixel by pixel basis. Thus, for example, for rendering a two-dimensional (2-D) processed image of pixels arranged in an n×m matrix wherein each pixel position is identified by the position (x,y), a value or data in pixel (1,1) of the first image is added to the data or value in pixel (1,1) in the second image, a value or data in pixel (1,2) of the first image is added to the value or data in pixel (1,2) of the second image, and so on for each pixel through pixel (n,m) of both images. Other known systems perform a variant of this technique and calculate the average of the values in each pixel instead of adding the two values. Thus, the final image contains averaged pixel values.

These systems, however, have a number of shortcomings. First, known image fusion techniques typically result in undesirable and unnecessary distortion. For example, if a portion of an image is clear and understandable by a user, while the corresponding portion of a second image is blurry, then adding or averaging pixel values can distort the clear image into one that is less clear. This undesirable effect is the result of incorporating elements of the blurry pixel(s) into the clear pixel(s) through addition or averaging. As a further example, adding unnecessary background regions to a bright image region can decrease the contrast and quality of the bright image region. For example, if regions of two images have high dominance or are bright, then adding two bright regions together can result in a final image that is "overexposed" or too bright. This results in a saturated image. Finally, averaging two dim image regions can result in a relatively dim image, and image regions that were originally dim can have their brightness further reduced.

Other known systems have attempted to overcome these shortcomings using techniques that identify patterns in images and forming a fused image on the basis of patterns. Each source or original image is decomposed into multiple, lower resolution images using filters with different bandwidths (e.g., based on Gaussian roll-off or a Laplacian "pyramid" approach). The pyramid approach is based on using different resolutions for different image regions—coarse features are analyzed at low resolution, and fine features are analyzed at high resolution. These systems, however, are also deficient in that the complete image from each sensor is received before the process of constructing a pyramid can begin. This requirement typically results in a time lag of at least one image from the slowest sensor. Such a time lag is unacceptable in sensors placed on fast moving platforms, such as aircraft or other vehicles, or more generally where real-time operation is desired.

Other known systems use a technique in which the Laplacian method is modified and source images are decomposed into patterns which are assigned saliency values or weights. A pattern is "salient" if it carries information that is useful to understanding the image. A final image is formed on the basis of "weighted" patterns. These techniques, however, can also be deficient in that they typically involve analyzing and assigning saliency weights to each pixel or region of the entire image. Then, the entire image is processed. Thereafter, the salient patterns are selected. As a result, excessive time is wasted analyzing regions of entire images and their corresponding saliency values.

These shortcomings are particularly problematic when known image systems are used in connection with time sensitive activities, e.g., landing an airplane, driving a tank, etc. In these situations, it is desirable that clear images be generated quickly. Known techniques, however, typically cannot generate quality images within these time constraints or typically do so only after full images are available for processing.

Accordingly, a need exists for a method and system that effectively and efficiently select useful, pertinent or relevant information from source images to form a more informative or useful processed image which includes relevant, pertinent and useful information from each of the source images in a time efficient manner. Further, it is desirable to apply the selective image fusion technique to a variety of detectors or image generators to provide flexibility for use in different applications.

SUMMARY OF THE INVENTION

The present invention provides a method and system for selectively combining regions of images generated by different sensors (also herein referred to as sensor or source images) to form a processed or fused image using the relevant information from the sensor images. The method and system are implemented by dividing each sensor image into image regions, and generating for each image region a map of contrast values by means of for example, a convolution. The map of contrast values for one sensor image is then compared to the corresponding map of contrast values for the other sensor image. Between or among the compared contrast values, one contrast value is selected based on a selection criterion, which can be, for example, the greater of the two or more contrast values compared. The image regions corresponding to the selected contrast values are then used to form the processed image. According to the present invention the image regions can be divided on a pixel-by-pixel basis, based on groups of pixels, or based on arbitrarily shaped regions.

In yet further accordance with the invention, each sensor detects a different wavelength. Also in accordance with the present invention, images from different types, numbers, and combinations of sensors can be processed. Sensors that can be used include infrared (IR), radio-frequency sensors (e.g., active sensors such as radar, or passive sensors such as radiometers)".

In still further accordance with the present invention, image regions from a plurality of sensors are combined to form the processed image.

In further accordance with the present invention, contrast maps for images from a first sensor and a second sensor are combined to form an intermediate contrast map, which is then compared with a contrast map of third image to form the processed image.

In further accordance with the invention, the image fusion method and system are used in connection with directing a moving vehicle such as an aircraft, watercraft, automobile, or train.

In further accordance with the invention, the intensity or luminance of one or more image sections is adjusted across the processed image. One sensor is selected as a reference sensor, and an average intensity of regions of the reference sensor image is determined. The intensity of the same or corresponding region or an adjacent region in the processed image is adjusted by combining the determined average luminance values of the reference image and intensity values of the processed image.

Also in accordance with the invention, the method and system are implemented to filter portions of the sensor images before contrast comparisons are performed.

BRIEF DESCRIPTION OF THE DRAWINGS

FIGS. 6A–F illustrate dividing an image into different image regions, including on a pixel-by-pixel basis, groups of pixels, or arbitrarily defined regions;

DETAILED DESCRIPTION

In the following description of embodiments of the invention, reference is made to the accompanying drawings which form a part hereof, and which is shown by way of illustration specific embodiments in which the invention may be practiced. It is to be understood that other embodiments may be utilized as structural changes may be made without departing from the scope of the present invention.

Figure 1:
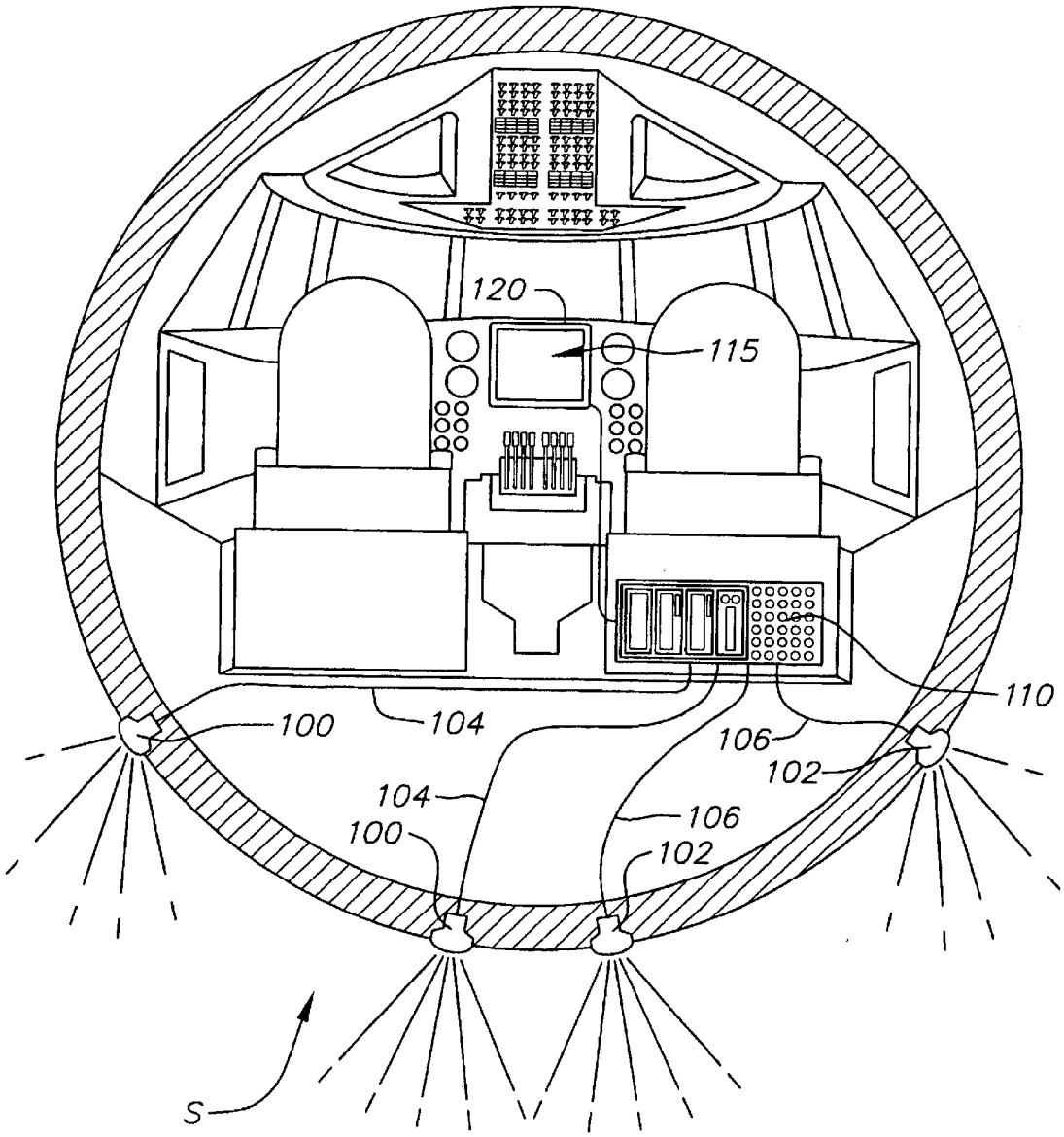
FIG. 1 is a diagram of an embodiment of a system in accordance with the present invention, including a processor or computer, two sensors, and a display within a moving vehicle, such as an aircraft.

With reference to FIG. 1, a view from a cockpit in an aircraft, a system S of the present invention is shown, having sensors 100, 102 and a processor 110 and a display 120. The sensors 100, 102 provide respective image data or streams 104, 106 (i.e., sensor or source images) to the processor 110, e.g., a computer, micro-controller, or other control element or system. The sensors can detect the same, overlapping, or different wavelengths. Moreover, the sensors can also detect the same field of view, or overlapping fields of view.

The processor 110 is programmed to selectively combine regions from each image 104, 106 into a processed or fused image 115. More specifically, the processor 110 compares regions of each image 104, 106, and selects image regions based on a selection criterion, for example, a comparison of contrast values representing the apparent difference in brightness between light and dark areas of sensor images. The processor can be programmed to consider different selection criteria including, but not limited to, the greater or maximum contrast values of each comparison. Thus, the processing system essentially extracts the desirable regions or regions of choice based on the selection criterion from one or more or all of the images. The selected regions are pieced together to form the fused image 115 (much like a jigsaw puzzle is formed from multiple pieces, except that each piece of the puzzle can be selected from multiple sources). The "puzzle pieces" or image regions can come from a single image, some of the images, or all of the images. The fused image 115 is then presented to the pilot or user through the visual display 120. The fused image can also be provided to an image processor or computer for further processing.

While FIG. 1 illustrates the application of the system S in an aircraft, those skilled in the art will recognize that the system can be applied to many other vehicles and used in various applications as will be described.

Figure 2:
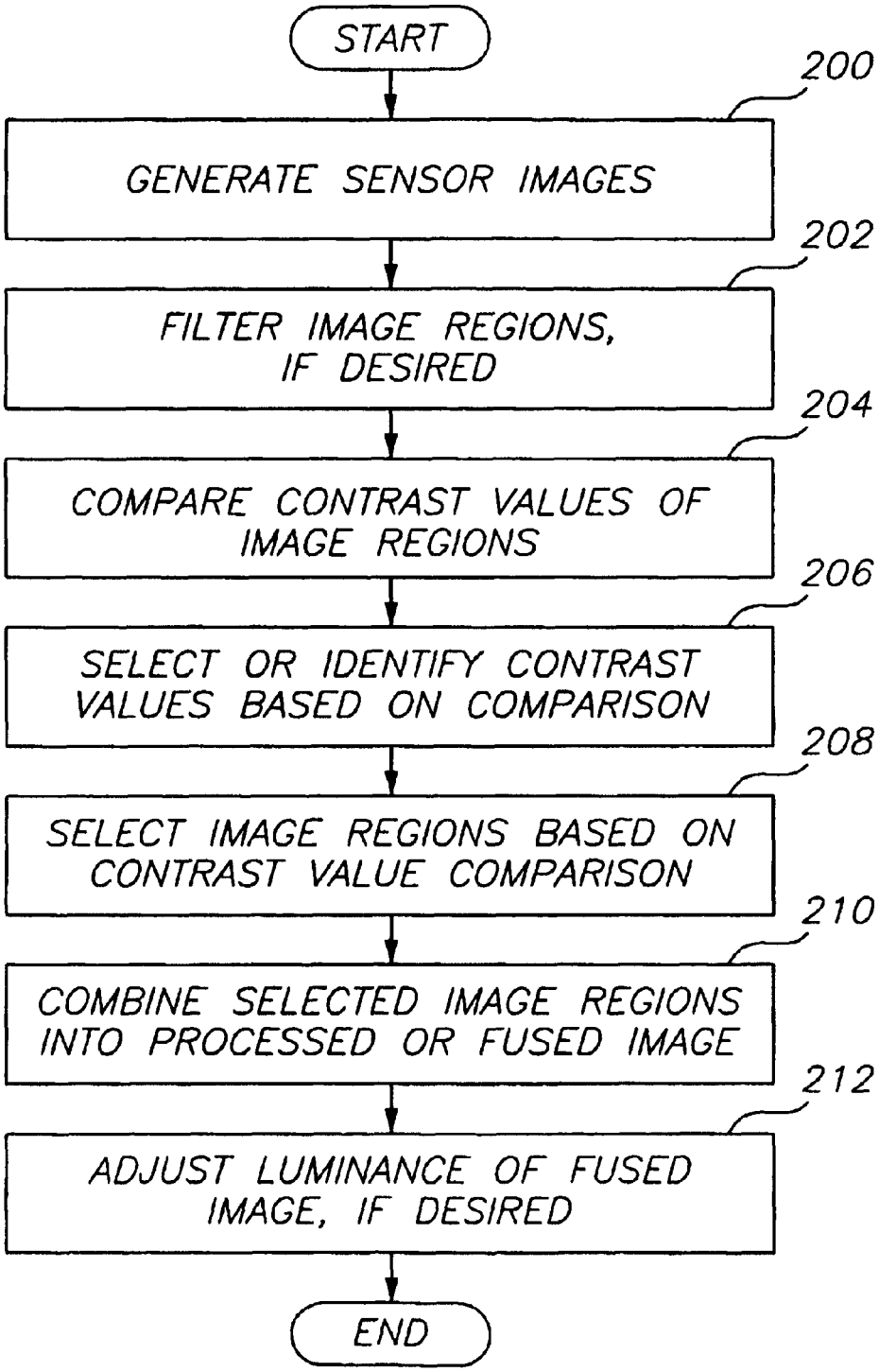
FIG. 2 is a flow diagram illustrating the processing of images generated by sensors to form a processed or fused image.
Figure 3:
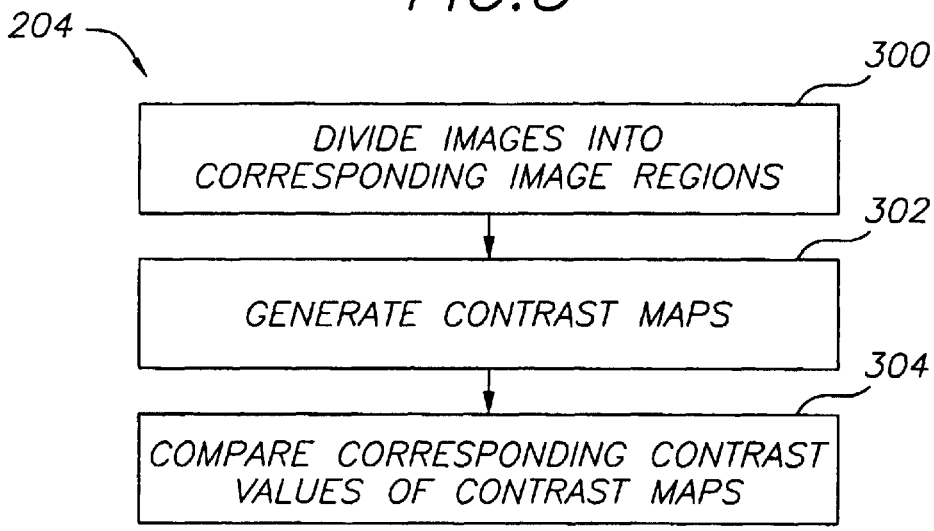
FIG. 3 is a flow diagram illustrating the manner in which contrast values are compared.
Figure 4:
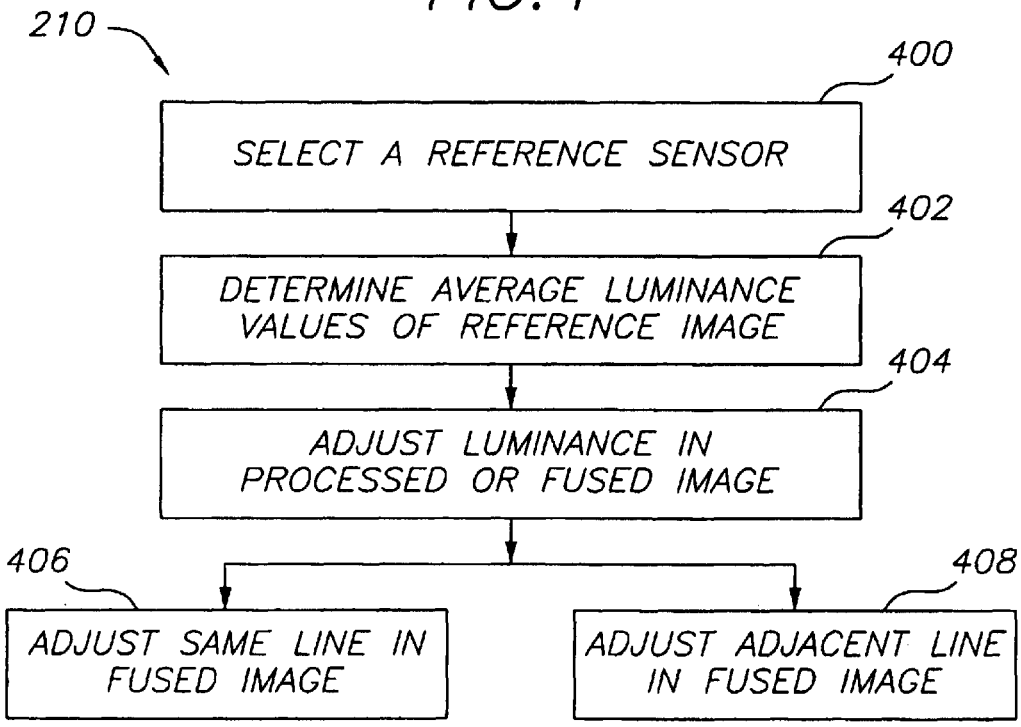
FIG. 4 is a flow diagram illustrating the manner in which luminance of a processed image is adjusted.

The technique of fusing or selectively combining portions of images 104, 106 into a processed image 115 is illustrated in the flow diagrams of FIGS. 2–4. As shown in FIG. 2, in step 200, each sensor generates an image, and the image data is provided to the processor. In step 202, if desirable, image regions can be filtered for exclusion from processing, exclusion from the processed image or to de-emphasize their contribution to the processed image. In step 204, contrast values of corresponding regions of each sensor image are compared. In step 206, the selection criterion is applied for selecting or identifying certain contrast values. In an embodiment of the system S, the selection criterion may be to select or identify the greater or maximum contrast values; however, the selection criterion, criteria or process may be altogether different in another embodiment of the system S depending on how the system is utilized. In step 208, image regions corresponding to the selected or identified contrast values are identified or selected. In step 210, the selected image regions are combined, that is, effectively "pieced together" to form the fused or processed image. Then, in step 212, if desirable, the intensity or luminance of the processed or fused image is adjusted or corrected to produce a clearer image.

FIG. 3 further illustrates step 204 or comparing contrast values. In step 300, each sensor image is divided into a plurality of image regions. Then, in step 302, a contrast map for each sensor image is generated. Each contrast map includes contrast values for each defined image region. In step 304, contrast values of image regions of one sensor image are compared to contrast values of corresponding image regions of the other sensor image(s). Corresponding image regions as used in this context refers to sensor images that at least overlap. For example, if the field of view of one sensor image includes an airfield runway, this sensor image "overlaps" with the field of view of another sensor image if the latter also includes the same airfield runway. If the fields of view of the two sensor images are identical (or nearly identical) with each other, the images are deemed to have 100% percent overlap (so on and so forth).

Turning now to FIG. 4, step 212 or adjusting the intensity or luminance of the fused image, is illustrated in further detail. In step 400, one sensor is selected as a reference sensor, i.e., the sensor for which luminance values are to be matched. Then, in step 402, the average luminance or intensity of image regions of the reference sensor image (e.g. cross-sectional lines) is determined across the image. Next, in step 404, the intensity of one or more regions of the fused or processed image is adjusted by combining the determined average luminance values and intensity values of the fused image to form a luminance-corrected fused image. The intensity adjustment can be applied to the same region or an adjacent to following regions. For example, the adjustment can be applied to the same region or line 406 for which the intensity was determined, or an adjacent or following region or line 408 in the fused image.

Those persons of skill in the art will recognize that the image fusion method and system can be used in many different environments and applications that process multiple images. For example, besides an aircraft (e.g. an airplane, jet, helicopter, etc.) the method and system can be implemented in other moving vehicles such as a watercraft, an automobile, or a train. Moreover, the image fusion method and system can be used to display images from medical instruments (which use, e.g., ultrasound, infrared, laser imaging or tomography sensors), and surveillance systems. Indeed, many applications can benefit from the selective fusion of image regions to form a processed or fused image that includes relevant information or information of choice from each sensor image.

However, for purposes of explanation, this specification primarily refers to images related to an aircraft. Such images may be related to landing, taxiing, takeoff, or cruising of the aircraft and in connection with applications to prevent Controlled Flight Into Terrain (CFIT). As a specific example of how the system can be used in aircraft applications, this specification refers to processing images generated by a radar sensor and an IR sensor. However, as will be explained, many different types, numbers, and combinations of sensors and sensor images can be processed. Accordingly, the example system and method explained in this specification can be used with many different applications.

Images and Sensors

Figure 5A:
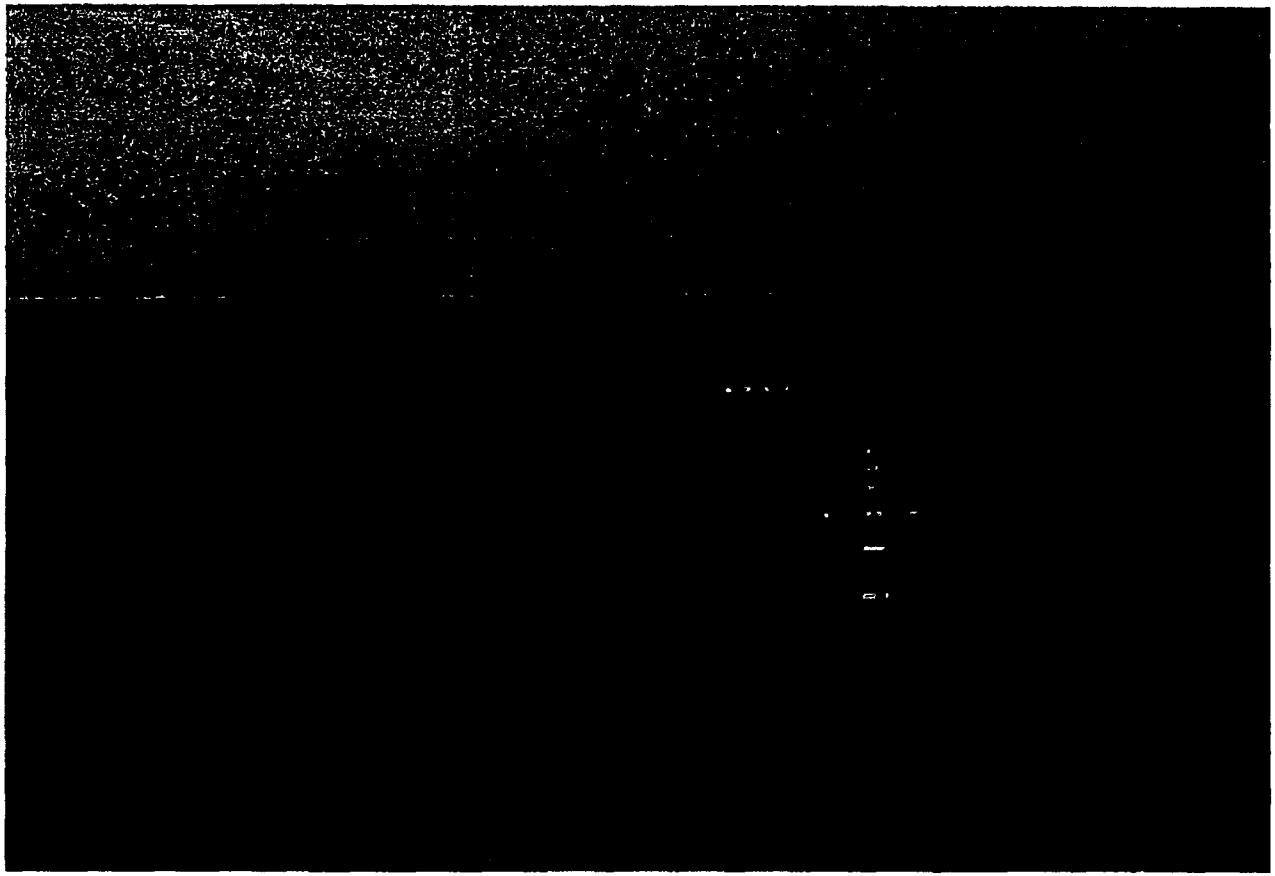
FIGS. 5A–C are black and white photographs illustrating respective images of radar sensor, an infrared (IR) sensor, and a processed image including regions selected from the radar and IR images based on a selection process or criteria.
Figure 5B:
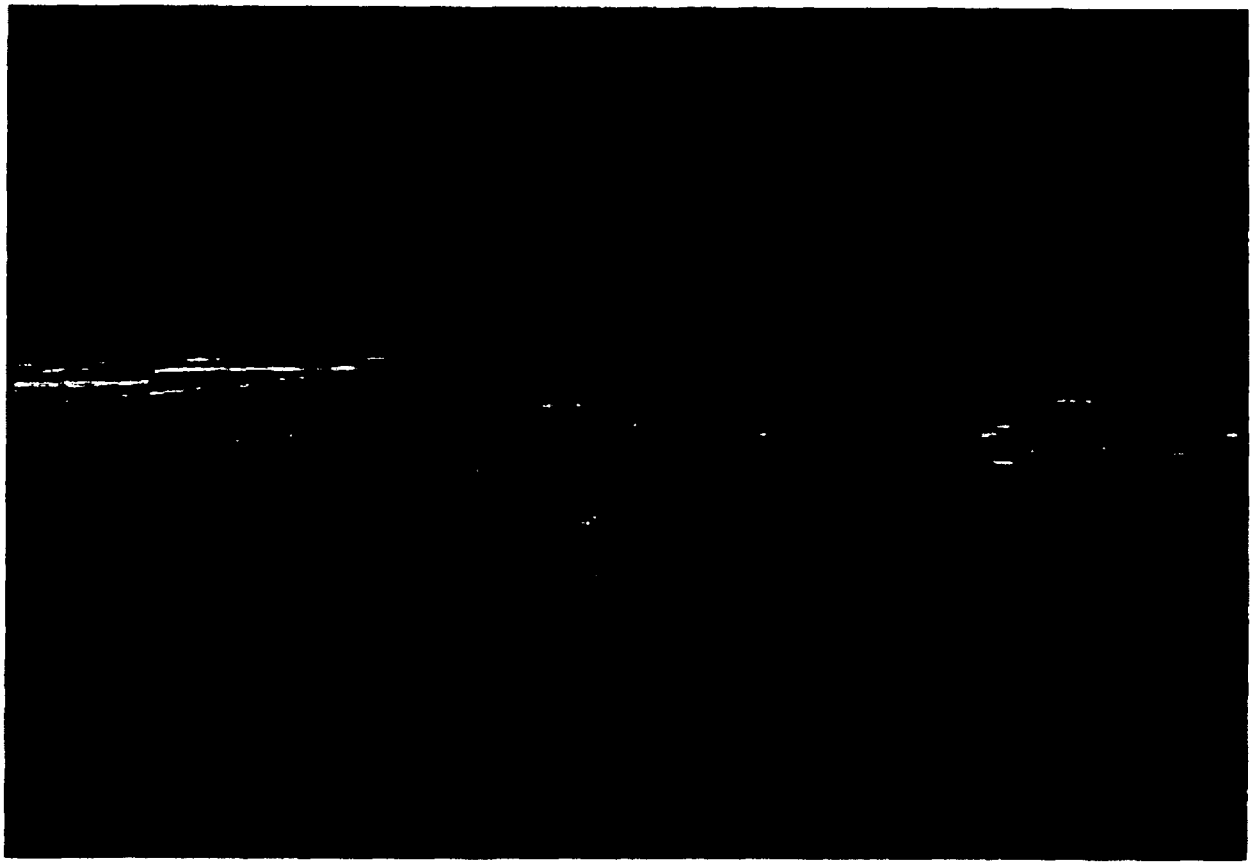
Figure 5C:
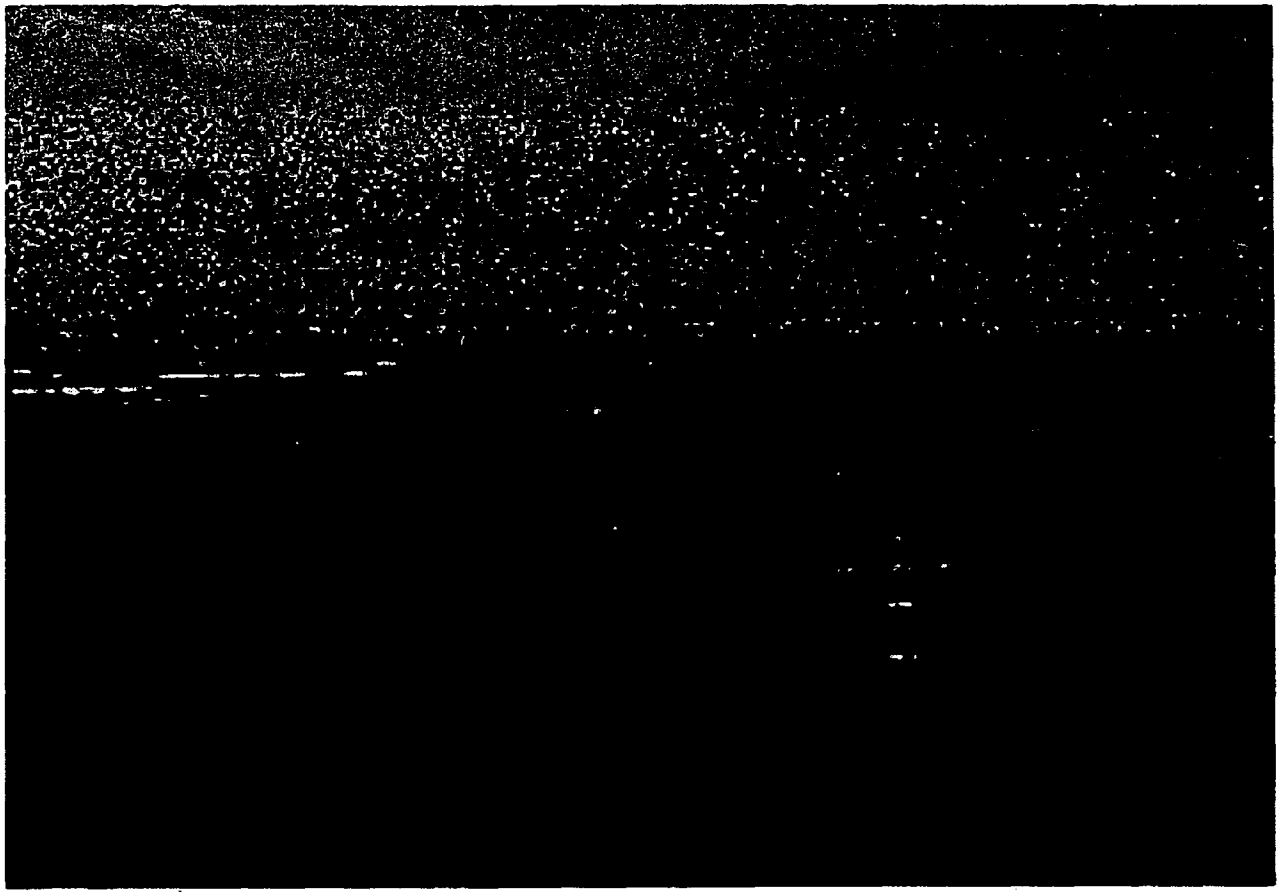
Figure 11A:
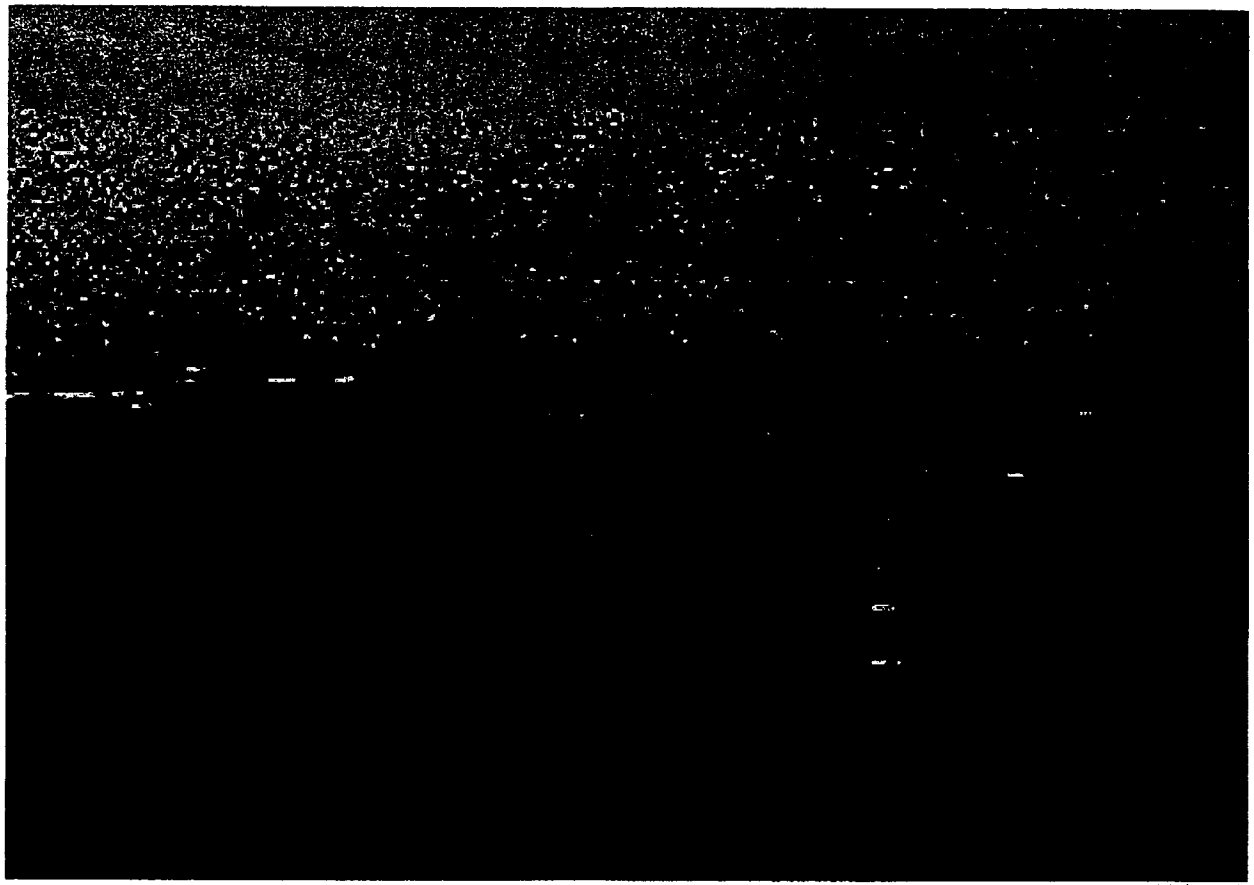
FIGS. 11A–B are black and white photographs illustrating a processed or fused image before and after luminance correction.
Figure 11B:
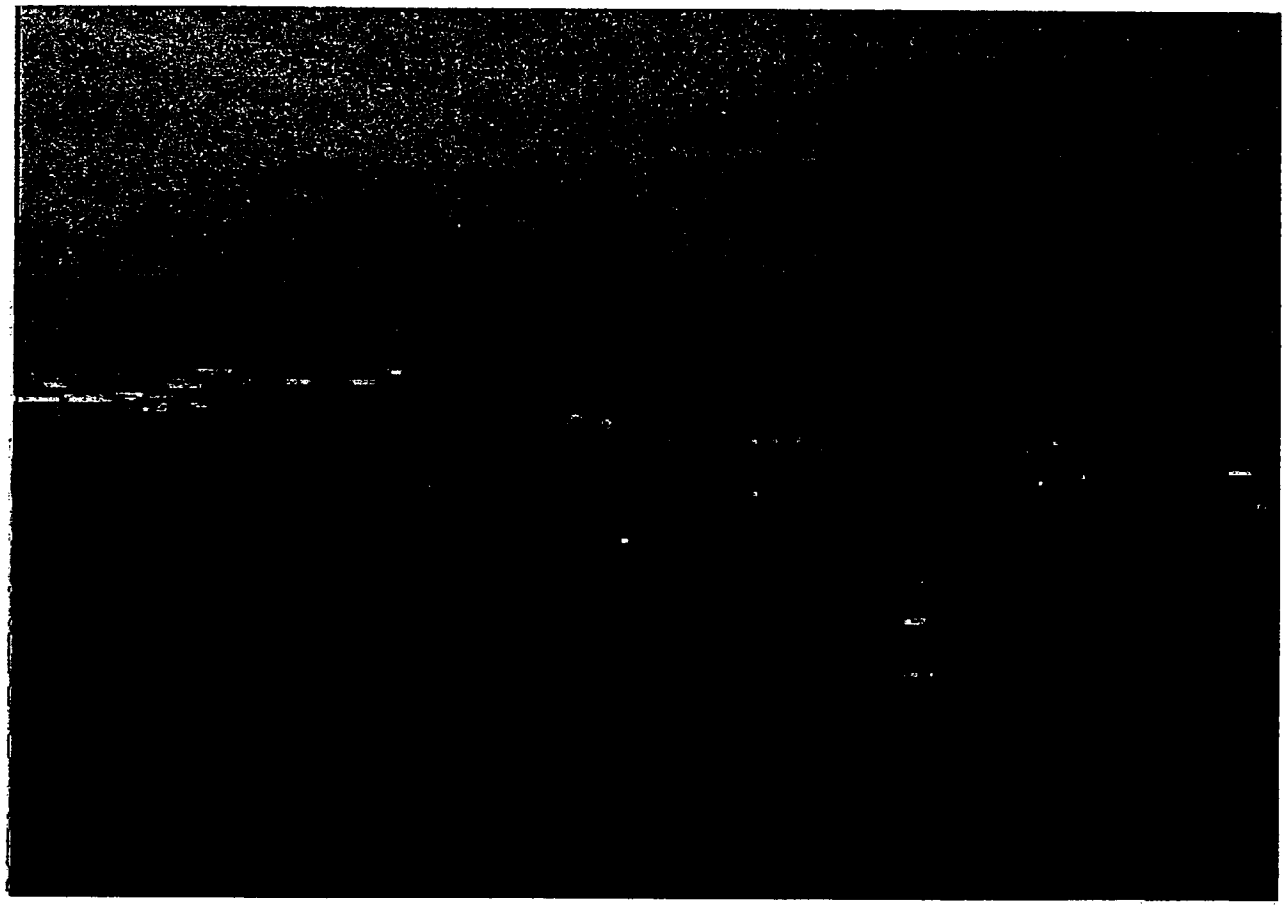

Turning now to FIGS. 5A–C, sensors 100, 102 generate respective images 104, 106, e.g., images 500, 510 illustrated in FIGS. 5A–B. Selected regions of one or both images are used, that is, effectively joined or pieced together to form a fused or processed image 115, e.g., the fused image 520 illustrated in FIG. 5C. Depending on the content of the source images, it may be desirable to further process the fused image, e.g., as later explained in connection with FIGS. 11A–B.

More specifically, FIG. 5A illustrates an image 500 of a runway generated by an infrared (IR) sensor. The IR sensor can operate at various IR wavelength ranges, e.g., 0.8 to 2 μm, 3–5 μm, 8–12 μm, or combinations and extensions thereof. One example source of an IR sensor that can be used is available from BAE SYSTEMS, Infrared Imaging Systems, Lexington, Mass. FIG. 5B illustrates the same runway in the same or nearly the same runway scene, but as image 510 generated by a radar sensor. Radar sensors can be X, K, Ka or other band radar sensors. Suitable radar sensors for use with the present invention are available from, for example, BAE SYSTEMS Aircraft Controls, Santa Monica, Calif.

In this instance both the IR sensor and the radar sensor generally provide the same or overlapping fields of view such that objects or conditions visible in both fields of view may be better detected by one sensor than the other sensor. Those of ordinary skill in the art will recognize that the system and method can be applied to images with different degrees of overlap or fields of view, as later described. Moreover, while the described embodiment provides a specific example of a system including radar and IR sensors and images, different types, numbers, and combinations of sensors and images can be utilized. For example, the system can also be used with ultraviolet (UV) sensors, one example UV sensor being available from Pulnix America, Inc., Sunnyvale, Calif. Further, one of the sensors can be based on an active or passive radio-frequency (RF) system such as an imaging radar or radiometer, operating in various RF bands including but not limited to 10, 35, 76, 94, and 220 GHz, one example of such a sensor being available from TRW, Inc., Redondo Beach, Calif. As a further example, a sensor can be an ultrasonic sensor, such as those ultrasonic sensors utilized in medical imaging applications available from General Electric Medical Systems Division, Waukesha, Wis. A sensor can also be a visible band sensor, e.g., a low-light level visible band sensor, Charged Coupled Device (CCD), or color or grayscale camera which can use natural or artificial illumination, available from Panasonic, Inc., Secaucus, N.J.

Further, the image fusion system can be configured to process images from a plurality of sensors, e.g., three, four, or other numbers of sensors. One possible combination of sensors includes two IR sensors and a radar sensor. The images from all of the images can be jointly processed and selectively combined into a processed image. For example, images A, B, and C can be selectively combined into processed or fused image D. Alternatively, two sensor images can be processed, the result of which is processed with a third sensor image to form a processed or fused image or its representative contrast map. For example, images A and B are combined into image C or an intermediate contrast map C that is subsequently selectively combined with image D or contrast map D to form fused image E or further intermediate contrast map, and so on, until all of the images are processed to form a fused image. Indeed, different combinations of different number of sensor images can be processed with different iterations of comparisons as desired or needed.

The selection of the type of the sensors may depend on the conditions and environment in which the sensor is used. As previously discussed, one type of sensor may be better suited for one environment, whereas another sensor may be better suited for a different environment. More specifically, certain types of sensors may provide clearer images depending on whether the environment is daylight, night, fog, rain, etc. and depending on whether the image is distant or near. For example, radar sensors typically provide better images in fog conditions compared to IR sensors, but may lack the photograph-like qualities of IR images.

Comparing Contrast Values of Image Regions

Image region contrast values are compared (step 204) by dividing images into regions, generating contrast maps based on the defined regions, and comparing the corresponding contrast map values using a selection criterion or criteria. The comparison is based on aligned or pre-registered images or images arranged to permit comparison of related image regions. Thus, if images that do not overlap are processed, they are pre-registered or aligned such that related regions are compared as described in further detail below. Contrast values are then selected (step 206), for example, on a selection criterion favoring the greater or maximum contrast values. Other selection criteria may also be utilized, for example, temporal persistence, brightness, color, etc.

Dividing Images Into Regions

Initially, sensor sensors are divided into sensor regions as illustrated in FIGS. 6A–F. Images can be divided on a pixel-by-pixel basis 600a–b, 601a–b (FIGS. 6A–B) or based on groups of pixels 602a–b, 604a–b (FIGS. 6C–D). A pixel or group of pixels can be "black or white" to represent a monochrome image, different shades of gray (gray scale) to represent an image with different levels of intensities. A pixel or group of pixels can also have red, green, and blue dots which are activated to form part of a color image. Further, image regions can be defined as having arbitrary shaped regions or boundaries 606a–b, 608a–b, 610a–b, 612a–b (FIGS. 6E–F). As a result, one image region can be compared to another corresponding image region, for each region in each sensor image. For example, referring to FIGS. 6A–B, region 600a ($x_1$=1, $y_1$=12) can be compared to region 600b ($x_2$=1, $y_2$=12); and region 601a ($x_1$=17, $y_1$=10) can be compared to region 601b ($x_2$=17, $y_1$=10) can be compared to region 601b ($x_2$=17, $y_2$=10).

For purposes of explanation, FIGS. 5A–B and the related example image regions illustrated in FIGS. 6A–F involve the same or essentially the same images with generally aligned or pre-registered image regions, e.g., aligned or pre-registered pixels, groups of pixels, or arbitrary shaped regions. In other words, FIGS. 5A–B illustrate overlapping images (100% overlap) or images having a high degree of overlap (almost the same sensor images). As a result, the image regions in FIGS. 6A–F are aligned with each other in a series of corresponding image regions. Thus, an object (e.g., tree 607) is in nearly the same relative position within the sensor images, residing in the identical image regions of both sensor images, regardless of how the sensor images are divided into image regions.

However, those skilled in the art will recognize that the system and method can be utilized with different numbers, types, and combinations of sensor images having different degrees of overlap depending on the location, position, field of view, and detection capabilities of a sensor. In cases involving different degrees of overlap, the image regions can be aligned or pre-registered such that the comparisons can be performed.

For example, sensors can be positioned closely together (e.g., near the front or bottom of the aircraft) to detect essentially the same images, such as the runway scene illustrated in FIGS. 5A–B. As a result, the image regions in the same or similar images are generally aligned with each other in a corresponding manner, as illustrated in FIGS. 6A–F. In these cases, the image regions to which a selection process or criteria is applied (or image regions "competing" for selection and use in forming the processed image), can be considered to be all of the aligned image regions in FIGS. 6A–F since the images are generally the same with the same boundaries and fields of view.

As a further example, one sensor may detect a first image whereas a different sensor may detect most of the first image, but additional scene elements as well. This may occur when, for example, sensors are positioned apart from each other or are positioned to have different fields of view. In this instance, the selection process may be applied to some or all of the overlapping regions. The image regions are processed by application of a selection process or criteria such as contrast comparisons. The competing regions are compared, and the image regions are selected to form the processed or fused image. The image regions that are not overlapping or are not competing can be processed in different ways depending on, e.g., the quality of the source and fused or processed images, the types of sensors, and user and system needs. For example, non-overlapping images can be added to the processed image as filler or background. Alternatively, non-overlapping regions can be discarded and precluded from inclusion in the processed for fused image. In some cases, the overlapping regions may not be processed depending on the particular system and application.

Thus, the method and system can be utilized with images having different degrees of overlap and image regions having different degrees of alignment. The overlap and alignment variations may result from sensors having different detection capabilities and positions. However, for purposes of explanation, this specification and supporting figures refer to and illustrate images having a high degree of overlap with aligned, corresponding image regions. As a result, most or all of the image regions are competing image regions and processed with the selection criterion. However, the method and system can be configured to process other image region configurations having different degrees of overlap, alignment, and correspondence.

Generating Contrast Maps

Figure 7A:
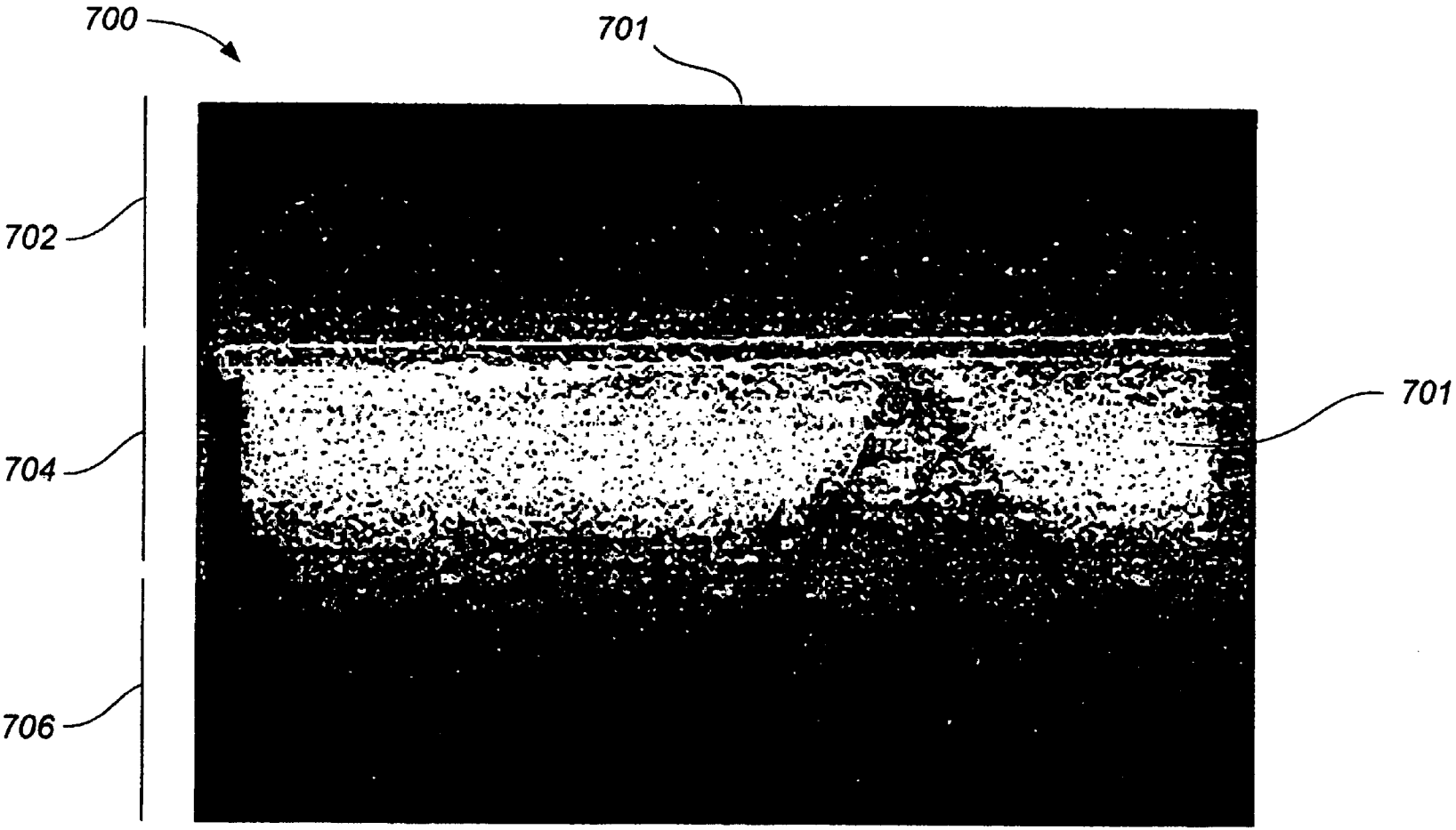
FIGS. 7A–B are black and white photographs illustrating contrast maps that are generated for each image.
Figure 7B:
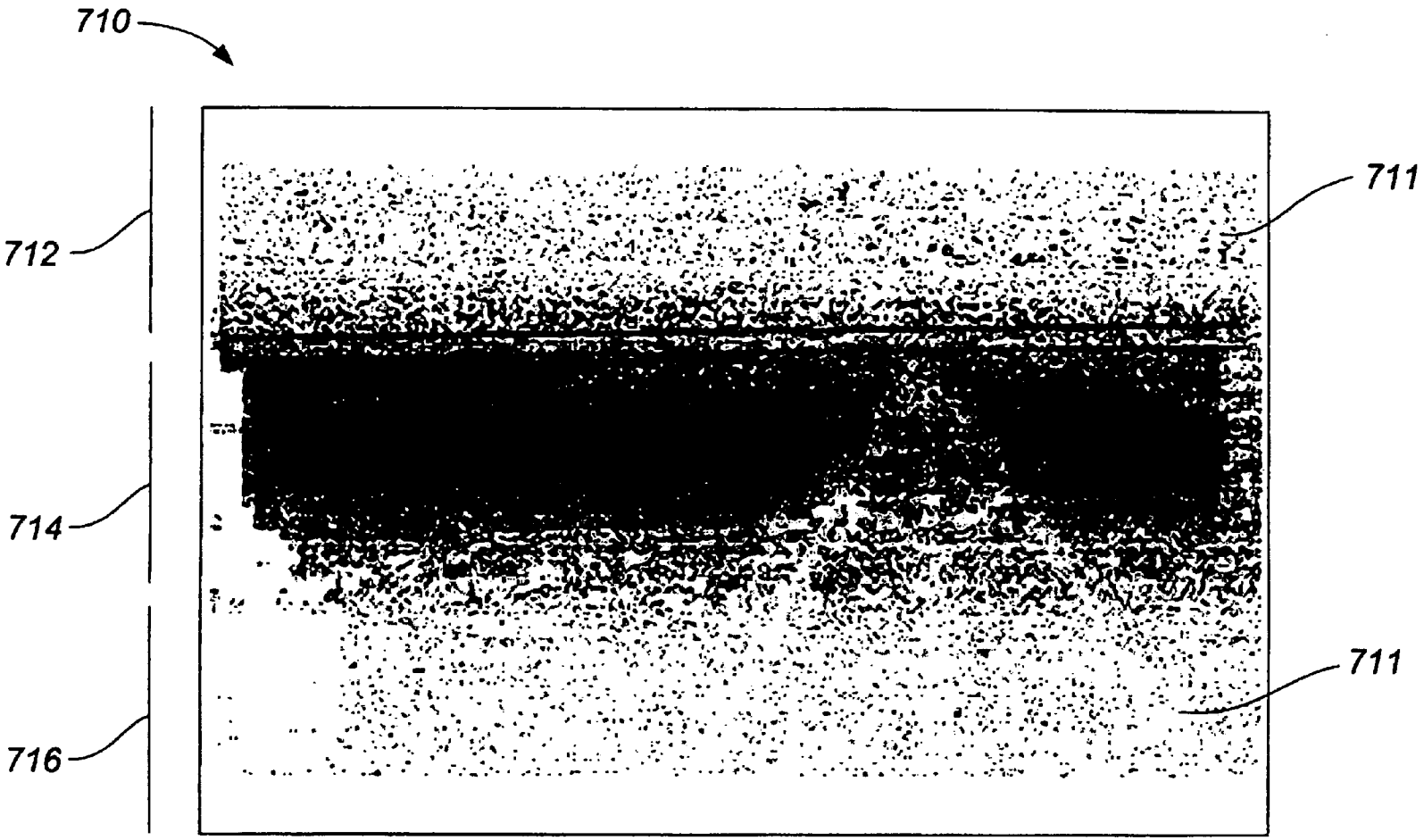

As shown in FIGS. 7A–B, contrast maps 700, 710 are generated for respective radar and IR images. Each contrast map includes a contrast value for each defined image region within that contrast map. Continuing with the example using radar and IR sensors, FIG. 7A illustrates a contrast map 700 for the radar image, including contrast values, one for each of the image regions into which the radar image has been divided. Similarly, FIG. 7B illustrates a contrast map 710 for the IR image, including contrast values, one for each of the image regions into which the IR image has been divided. In accordance with the present invention, there may be any number of image regions in each contrast map 700 and 710, where such number should preferably be equal and the image regions corresponding where the radar and IR sensors provide 100% overlapping images.

For this example radar map, the contrast values in the general top and bottom portions 702, 706 of the image/map are of a relatively lower value, and the contrast values in the general middle portion 704 are of a relatively higher value. For the example IR map, the contrast values in the general middle portion 714 are of a relatively lower value and the contrast values in the general top and bottom portions 712, 716 are relatively higher in value.

In accordance with the present invention, contrast maps including contrast values for each image region are generated via, e.g., a convolution with an appropriate kernel. One example convolution and kernel that can be utilized is a 2-dimensional (3×3) normalized convolution kernel:

$$K_c*S1(x,y),K_c*S2(x,y)$$

where denotes a convolution;

$$K_c = \begin{vmatrix} -\frac{1}{2\sqrt{2}} & -\frac{1}{2} & -\frac{1}{2\sqrt{2}} \\ -\frac{1}{2} & 2\frac{1+\sqrt{2}}{\sqrt{2}} & -\frac{1}{2} \\ -\frac{1}{2\sqrt{2}} & -\frac{1}{2} & -\frac{1}{2\sqrt{2}} \end{vmatrix} \cong \begin{vmatrix} -0.354 & -0.500 & -0.354 \\ -0.500 & 3.414 & -0.500 \\ -0.354 & -0.500 & -0.354 \end{vmatrix}$$

x,y are spatial coordinates of the image, ranging from 0 to the image width (w) and height (h), respectively;

S1 is the first sensor image, e.g., a mmW radar image stream; and

S2 is the second sensor image, e.g., an IR image stream, assumed spatially pre-registered to or aligned with the first or radar image.

The example kernel $K_c$ includes values that reflect a distance metric from its center. A contrast map is generated including contrast values for each image region of each image as a result of the convolution.

The processor can execute the convolution with a program in C-code or another programming language, or in dedicated integrated circuit hardware. Real-time implementation of the convolution can be achieved through the use of a Digital Signal Processor (DSP), Field Programmable Gate Arrays (FPGAs), Application Specific Integrated Circuits (ASICs) or other hardware-based means.

Selection of Contrast Values

Figure 8A:
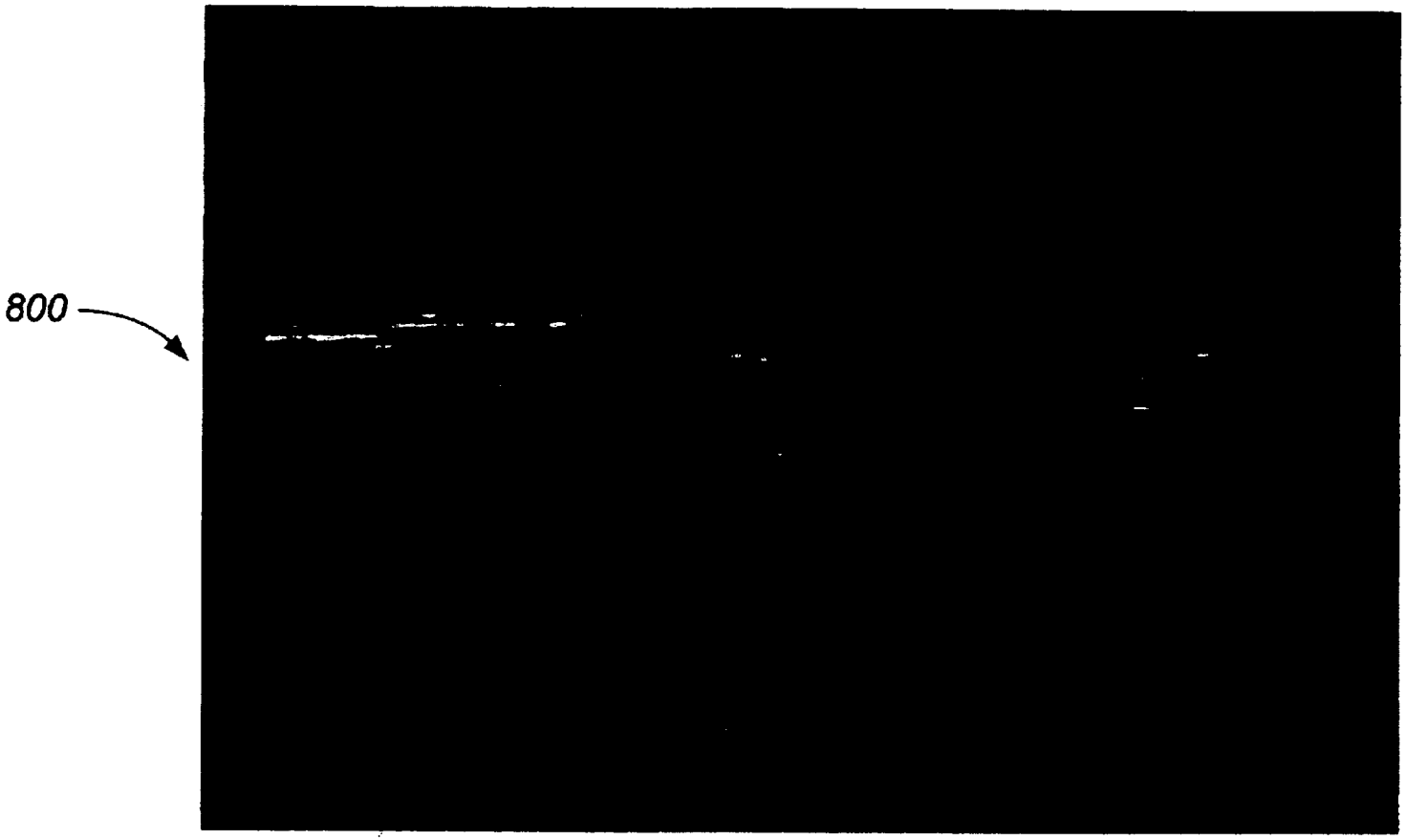
FIGS. 8A–B are black and white photographs illustrating contrast values selected from the contrast maps of FIGS. 7A–B based on a selection criteria.
Figure 8B:
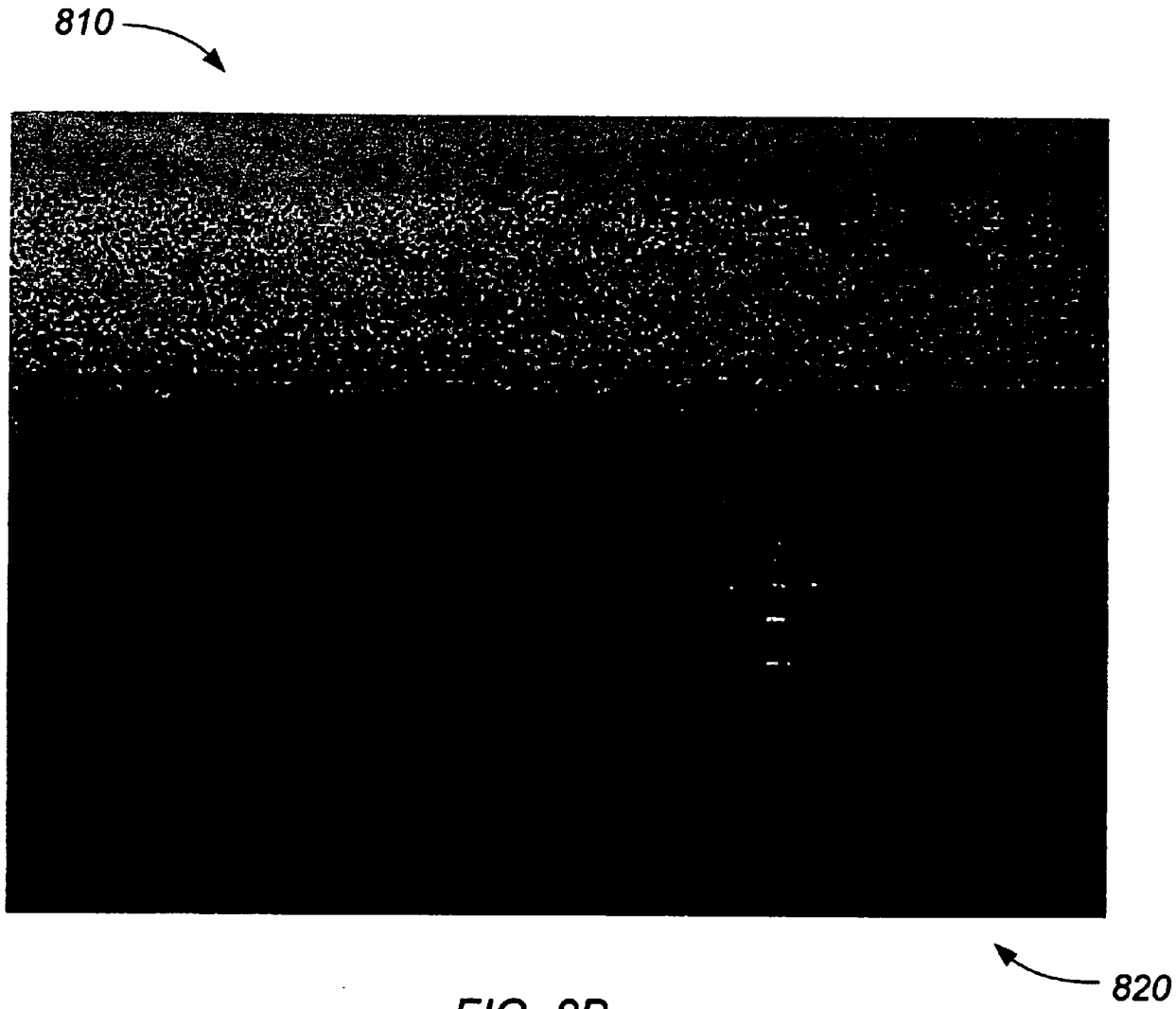

FIGS. 8A–B illustrate the pixel values that are used in forming the processed image, as selected based on a selection criterion performed on the comparison of contrast values in the contrast maps of FIGS. 7A–B. In this example where the selection criterion operates to select the greater of contrast values between an image region of the radar image and a corresponding image region of the IR image, FIG. 8A illustrates the pixel values of the selected (radar) contrast values of FIG. 7A, which as mentioned above, reside generally in the middle portion 800 of the radar image. Similarly, with the system S operating under the same selection criterion, FIG. 8B illustrates the pixel values of the selected (IR) contrast values of FIG. 7B, which as mentioned above, reside generally in the top and bottom portions 810 and 820 of the IR image.

Each image region associated with a selected contrast value is selected from each image and then combined (or "pieced together") with other such selected image regions to form the processed or fused image, e.g., the fused image illustrated in FIG. 5C. Thus, in this example, the criteria for selecting image regions based on maximum contrast values can be stated as follows:

$$F_{max\text{-}con}(x,y)=\max\{K_c*S1(x,y), K_c*S2(x,y)\}$$

where the "maximum criteria" operation is performed or an arbitrary shaped region. Thus, the selection of image regions based on maximum contrast essentially serves as a pixel value resulting in a fused image that includes a combination or superset of image regions from different images. The image regions may, as a result of the selection process, be selected all from a single image or from multiple images depending on the content and contrast values of the images. Some sensor images may not contribute any image regions to the fused or processed image. For example, if a first image has all of its contrast values identified or selected, then the processed or fused image will be the same as the first image. As a further example, if contrast values are selected from second and third images but not the first image, then the fused image includes regions from the second and third images but not the first image. Thus, in the processed image having image regions A, B and C, image region A may be from sensor image 1, image region B may from sensor image 2 and image region C may be from sensor image 3.

Figure 9:
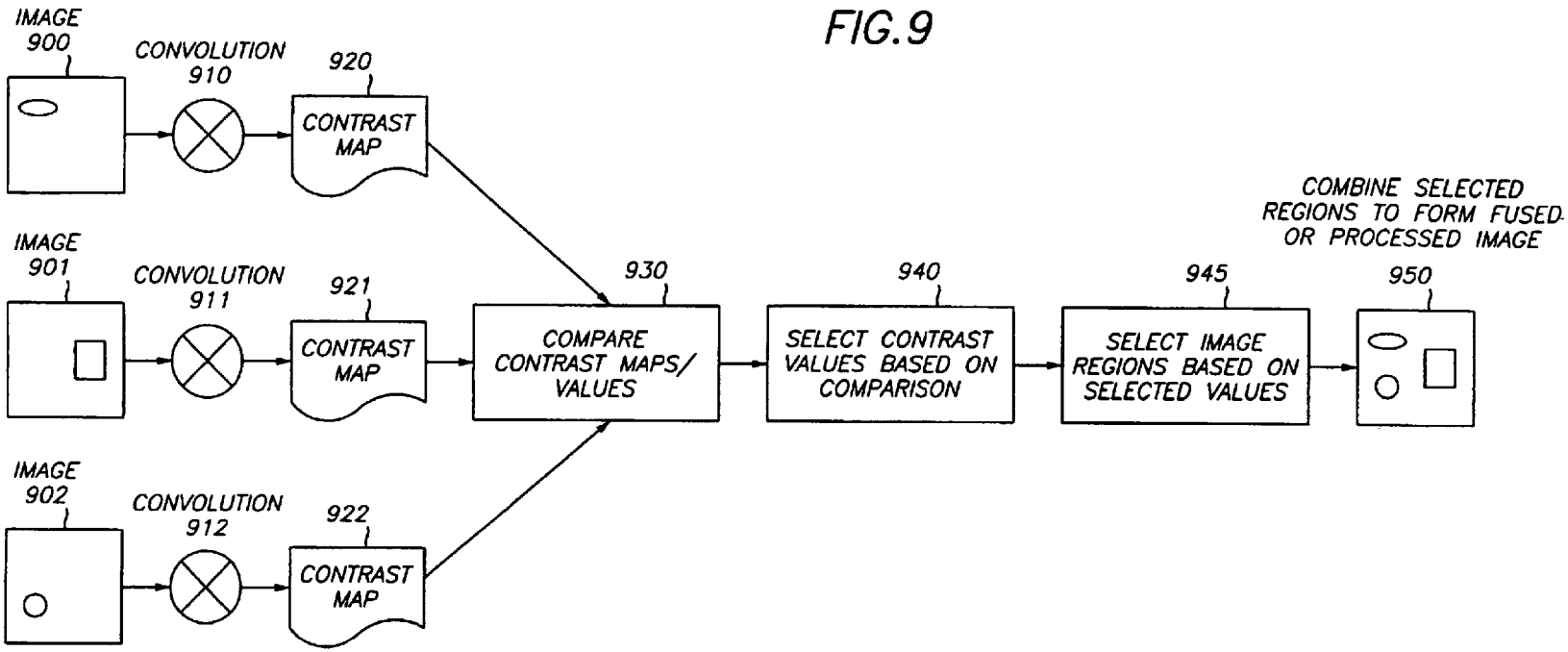
FIG. 9 is a flow diagram illustrating the processing of a plurality of images by comparing all of the contrast values of the images to form a processed or fused image.

The previously described example involving the application of a convolution results in the generation of two contrast maps. Indeed, other numbers and combinations of convolutions can be performed to generate multiple contrast maps for use in multiple comparisons or multiple sensor images. For example, referring to FIG. 9, images 900–902 are generated by respective sensors. A convolution with an appropriate kernel 910–912 is applied to the data of respective images 900–902 to generate respective contrast maps 920–922 as follows:

$$K_c*S1\ (x,y),\ K_c*S2\ (x,y),\ K_c*S3\ (x,y)$$

where the third sensor S3 is also an IR sensor, for example. Those persons of ordinary skill in the art will recognize that different kernels can be used with the same or different sensors. Thus, a process involving three convolutions can use, for example three different convolution kernels.

Then, corresponding contrast values of the three images are compared 930, and contrast values are selected 940 based on a selection criterion. The image regions selected 945 correspond to the selected contrast values. The selection of image regions based on maximum contrast value criteria can be expressed as follows:

$$F_{max\text{-}con}(x,y)=\max\{K_c*S1(x,y), K_c*S2\ (x,y), K_c*S3\ (x,y)\}$$

The selected regions from one or more of the sensor images are then pieced together to form a processed or fused image 950. Thus, in this example, all of the corresponding contrast values are compared together (three contrast values compared at the same time) to select the image region(s) having the maximum contrast value.

Figure 10:
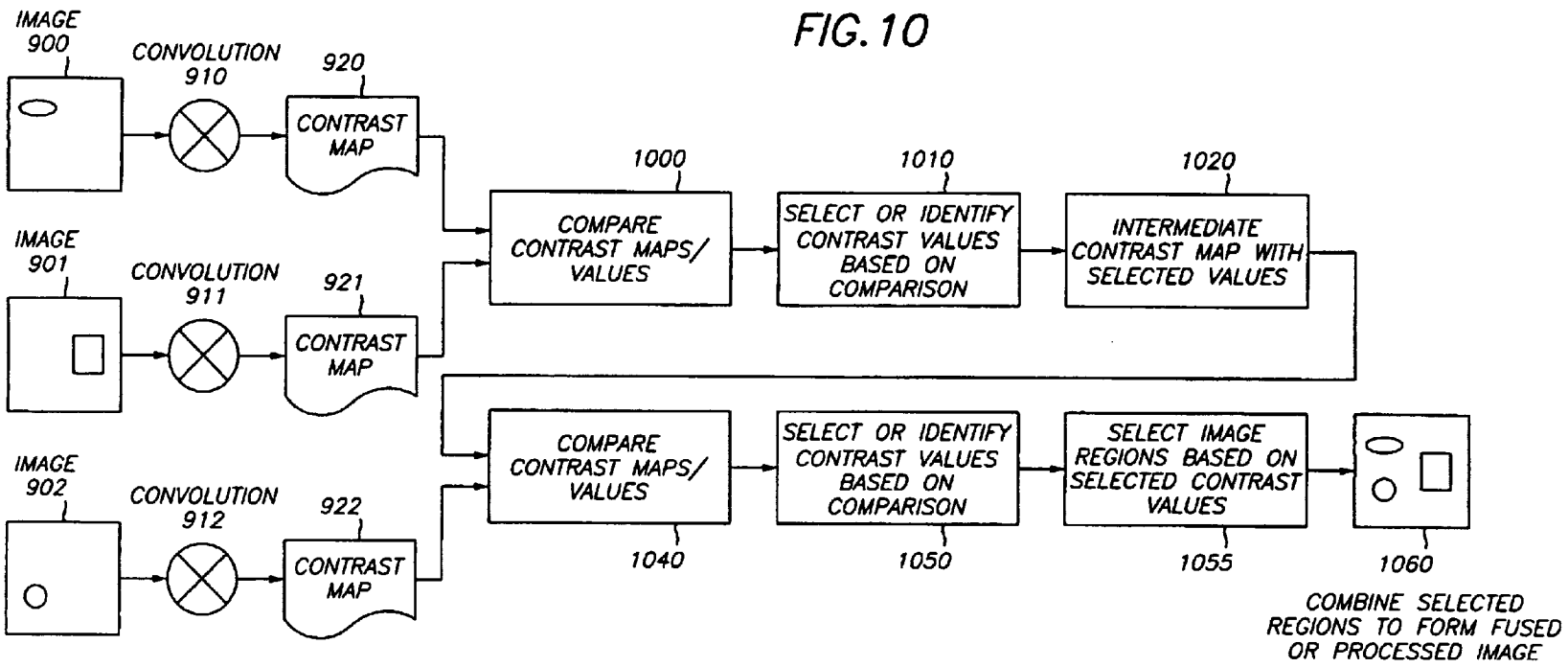
FIG. 10 is a flow diagram illustrating the processing of a plurality of images by performing multiple comparisons of contrast values to form a processed or fused image.

In an alternative embodiment, multiple iterations of convolutions can be performed to generate respective contrast maps, the values of which are compared in iterations to eventually form a processed image. For example, referring to FIG. 10, contrast maps 920–922 are formed for each image 900–902, as previously described via a convolution and appropriate kernel 910–912. However, instead of comparing all of the corresponding values of each contrast map together, iterations of contrast map comparisons are performed, possibly utilizing different contrast-selection kernels.

Thus, for example, a comparison 100 of contrast values in contrast maps 920 and 921 is performed resulting in a selection of a set of contrast values 1010 based on, e.g., greater or maximum contrast. The selected contrast values are selectively combined to form an intermediate image or contrast map 1030.

Contrast values in contrast map 1030 are then compared 1040 to contrast values in contrast map 922 from the third image 902. The contrast values are selected or identified 1050, and the image regions corresponding to the selected contrast values are selected 1055. The selected regions form the processed or fusedimage 1060. Those skilled in the art will recognize that different numbers of iterations or comparisons of different numbers of contrast maps can be performed with the same or different convolution kernel. Thus, the present image processing system and method provide flexible image fusion that is adaptable to different applications using convolution.

Correcting Luminance of Fused Image

The luminance or brightness of the fused image can be corrected or adjusted, if desirable, depending on the types of sensors utilized and the quality of the resulting sensor and fused images. Luminance correction is particularly useful when the fused image is not sufficiently clear to the pilot.

In the example involving radar and IR images, there may be noticeable artifacts in the fused image, as shown in FIG. 5C. The artifacts result from the brightness or luminance of the fused image being inconsistent, resulting in discontinuous luminance across the fused image. In this particular example, high-contrast regions selected from the radar image (central horizontal band in this example) are generally darker relative to the high-contrast regions from the IR image. The luminance distribution of the resulting processed or fused image varies between the luminance of the two input sensors. For example, the darker band across the center of the image is generally selected from the radar image, which, in that region, has higher contrast, but lower luminance than the IR image. This reduces the overall clarity of the fused image.

The luminance distribution within the fused image can be adjusted to generate a clearer fused image. Luminance adjustment is performed by determining average luminance values in regions of an image generated by a reference sensor, and adjusting the luminance of regions of the fused image based on the corresponding determined values. In the example images of FIGS. 5A and 5B, the luminance adjustment technique is based on luminance typically varying in a vertical cross-section of a sensor image (e.g., sky through horizon to foreground), but not as predictably in any horizontal cross-section (e.g., across the image at any particular elevation angle).

Reference Sensor

Luminance correction can be performed by selecting one sensor as a reference sensor and adjusting the luminance of the fused image to match or approximate the luminance distribution of the reference sensor. The reference sensor can be arbitrarily selected or based on the expected utility of a sensor in a particular situation. For example, a radar sensor generally provides more image detail in low-visibility conditions than an IR sensor. However, an IR sensor typically provides a more natural or photographic image, at least at close range.

For purposes of explanation, this specification describes the IR sensor I(x,y) as the reference sensor for luminance distribution, to capture the natural-looking characteristics of images from that sensor. However, the radar sensor or other sensors can be the reference sensor.

Determining Average Luminance

Adjusting luminance involves determining the average intensity in the reference sensor in specific image regions, such as, for example, strips along each image cross-section parallel the scene horizon. The scene horizon refers to the "actual" real-world horizon. The scene horizon may be at an angle relative to the image horizontal during a roll, bank or other motion of an aircraft.

The average luminance of each such strip of the reference sensor image is determined. Then, luminance values obtained from the determination are added to each corresponding strip of the fused image to adjust the luminance of the fused image. Further, if necessary, the degree of luminance can be weighted for a particular luminance adjustment effect. The weight λ can be used to reduce the effect of the luminance compensation, although a value of λ=1 has been determined to provide a sufficiently clear adjusted fused image in most situations.

Thus, the manner in which image is adjusted in a fused image can be expressed as follows:

$$F_{LC}(x, y) = F(x, y) + \frac{\lambda}{w}\sum_{x=0}^{sum} I(x, y)$$

where

F(x,y) are luminance values of the fused image;

λ is a weighting factor for different degrees of luminance adjustment;

w is the width of the image from x=0 to x=w; and $F_{LC}$ (x,y) is the luminance-compensated fused image.

Those persons of ordinary skill in the art will recognize that the reference sensor image can be sampled along different cross sections besides a horizontal cross section, and with different segments besides a strip across the image. The selection of the cross section and sampling segment may depend on various factors, including the types of sensors, sensor images, orientation of images, and application of the system or method. However, for purposes of explanation, this specification refers to cross-sectional sampling of strips of the reference sensor image, and correcting corresponding strips in the processed image.

An example of applying luminance adjustment is illustrated in FIG. 11. The runway scene portrayed in the fused image 1100 before luminance correction includes a number of artifacts that distort the processed or fused image. As a result, the runway scene is somewhat unclear, particularly in the middle portion of the image. The image 1110 represents the same image 1100 after luminance correction and selecting the IR sensor as the reference sensor.

As can be seen by comparing images 1100 (before luminance correction) and 1110 (after luminance correction), the luminance compensated image demonstrates less striking luminance variations in elevation, which otherwise tend to produce a noisy image. The result is a clearer, processed or fused image.

Luminance correction of the fused image can be performed by correcting different strips or regions of the fused image. For example, the mean luminance of the reference sensor is determined for an image line or strip in the reference sensor image. The determined mean luminance value from the reference sensor image is processed with, e.g. the previously stated luminance adjustment expression, to add it to each pixel in the corresponding fused image line or strip.

In an alternative embodiment, processing efficiency can be increased by using the mean or determined luminance value from one line of the reference sensor image and applying it as a correction to a line in the processed or fused image that is adjacent to a line in the fused image corresponding to the determined line in the reference sensor image (e.g., the next line above or below the corresponding determined line). Applying luminance values to the following line is generally acceptable since the mean typically does not substantially vary between successive image lines. However, this technique can be applied to adjust the next line above or below the subject line, or a number of lines separated from the reference line depending on luminance variation.

Luminance correction can also be adapted to situations in which the scene horizon is not parallel to the image horizontal, e.g., when an aircraft rolls or banks to one side.

In this case, the scene horizontal angle and elevation are generally known from aircraft orientation sensors. Luminance correction can be calculated from the reference sensor, stored as a two-dimensional lookup table. The correction obtained from the lookup table is applied on a pixel-by-pixel basis to the fused image. In order to minimize latency and processing time, table values can be applied to the current frame based on values calculated during the previous frame, if sufficient memory storage resources for the full-image lookup table are available. These requirements can be approximately equal to the image frame size, for example, 320×240 bytes for an 8-bit per pixel sensor or other sizes depending on the details of the image produced by each sensor.

Spatial Pre-Filtering of Sensor Images

Regions or portions or sensor images can also be filtered to simplify processing of comparing contrast values and application of the selection criteria. The filtered regions can be represented as a number less than one to de-emphasize their contribution to the fused image, or a zero to remove them from contributing at all of the fused image, to simplify and reduce processing time.

Image regions that can be filtered include portions of the images that will not be included in the fused image, e.g., regions above a radar horizon in the case of a radar sensor. If a radar sensor is utilized, there is typically no useful information above the radar horizon (i.e., beyond the detection limit of the radar sensor) and little or no information in the near field (at least at higher altitudes). IR sensors are typically most effective at shorter ranges (near field), especially in weather conditions where the far-field cannot be detected due to the sensor's inability to penetrate obscurants such as rain or fog. Thus, with the example radar and IR sensors, radar image regions above the radar horizon and in the near field can be pre-filtered, and IR image regions in the far field can be pre-filtered. Other fields and regions may be suitable for filtering depending on the sensors, resulting images generated thereby and the needs of the user or system.

Figure 12A:
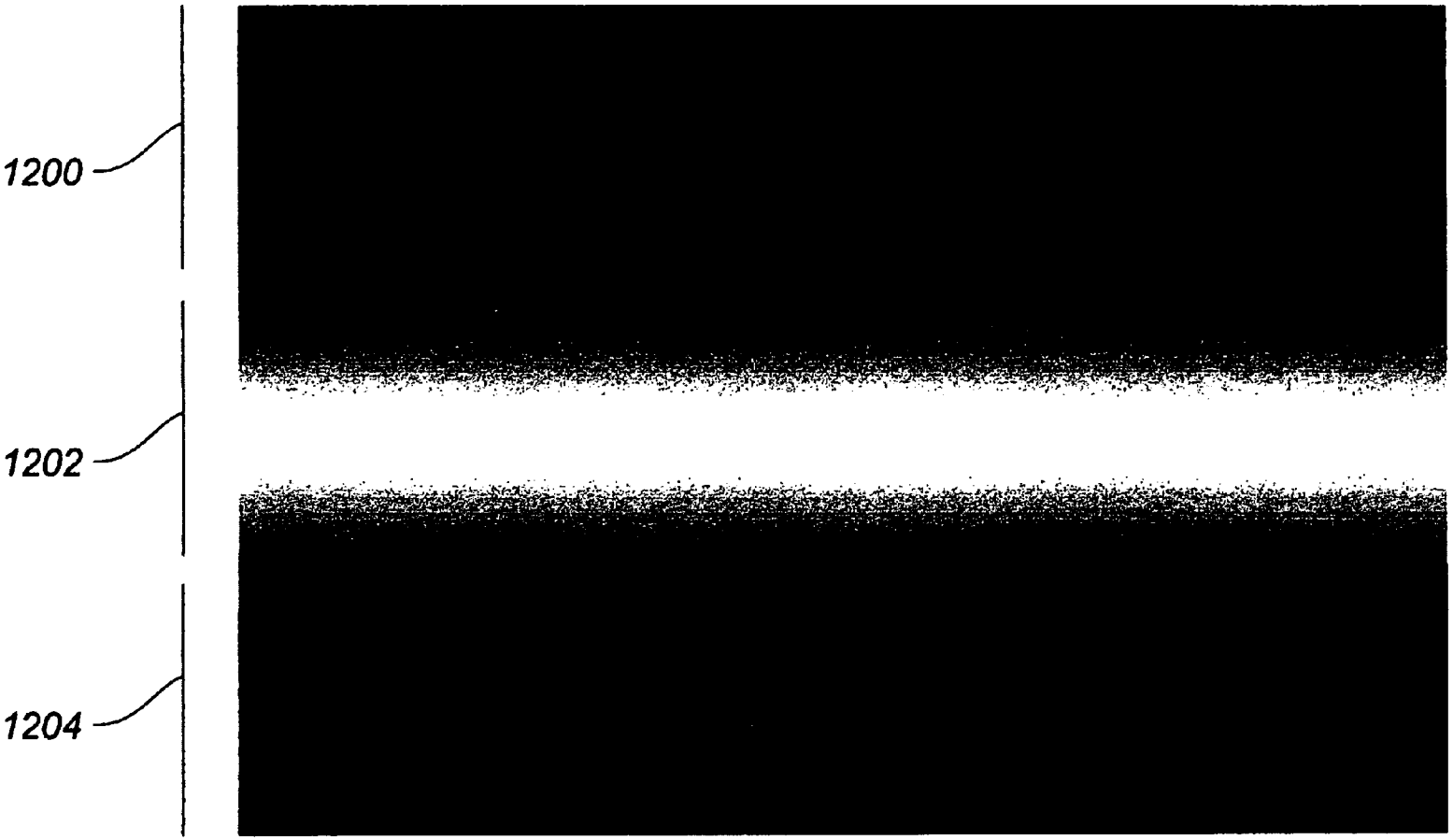
FIGS. 12A–B are black and white photographs generally illustrating spatial filters.
Figure 12B:
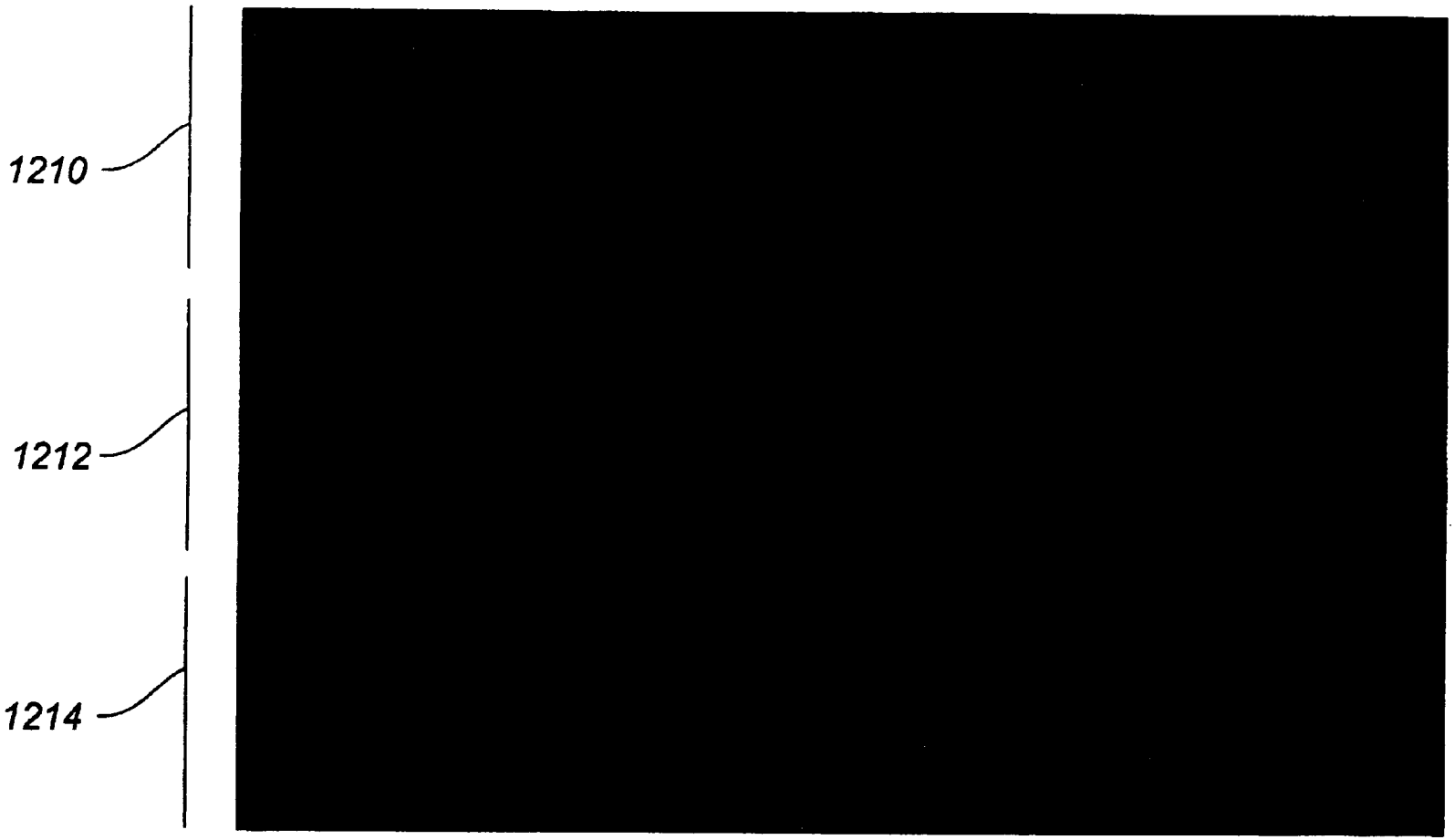

A general spatial filter is illustrated in FIGS. 12A–B. FIG. 12A illustrates a filter for an image generated by a radar sensor. Specifically, the filter removes information where the radar sensor is least effective, i.e., above the radar horizon 1200 and in the near field 1204, while permitting the remaining radar sensor information 1202 to pass and be included in a contrast map. The filtered data is represented as darker regions 1200, 1204. Similarly, in FIG. 12B, the filter removes information where the IR sensor is least effective, i.e., in the far field 1212, while permitting the remaining information 1210 and 1214 to pass and be included in a contrast map. While FIGS. 12A–B essentially illustrate almost complementary filters, those skilled in the art will recognize that this will not always be the case with different sensor/image combinations. Different sensors may require different filter functions.

Once technique for filtering image regions is performed by selecting space-dependent $\alpha$ and $\beta$ weighting functions. Continuing with the example involving radar and IR images, the weighting functions can be selected to overweight the radar image contribution in those regions where the radar signal is strongest, and, overweight the IR signal everywhere else.

The weighting function can be implemented through a spatial filter or other smoothing function that does not introduce unnecessary artifacts, e.g., a one-dimensional Gaussian weighting function as follows:

$$\alpha(x,y)=\alpha_M e^{-b_M(y-y0)}+p_M$$

$$\beta(x,y)=\alpha_1(1-e^{-b_I(y-y0)^2})+p_I$$

where:

$\alpha_M$ and $\alpha_I$ determine the maximum amplitude of the Gaussian function (usually 1, but other values can also be used to overweight one sensor, or to compensate for the pedestal values, $P_M$ and $P_I$);

$b_M$ and $b_I$ determine the Gaussian function width, i.e., the region of interest of the sensor or the region where the sensor information is clustered; and $y_0$ shifts the center of the Gaussian function vertically up and down in the image as required.

Figure 13A:
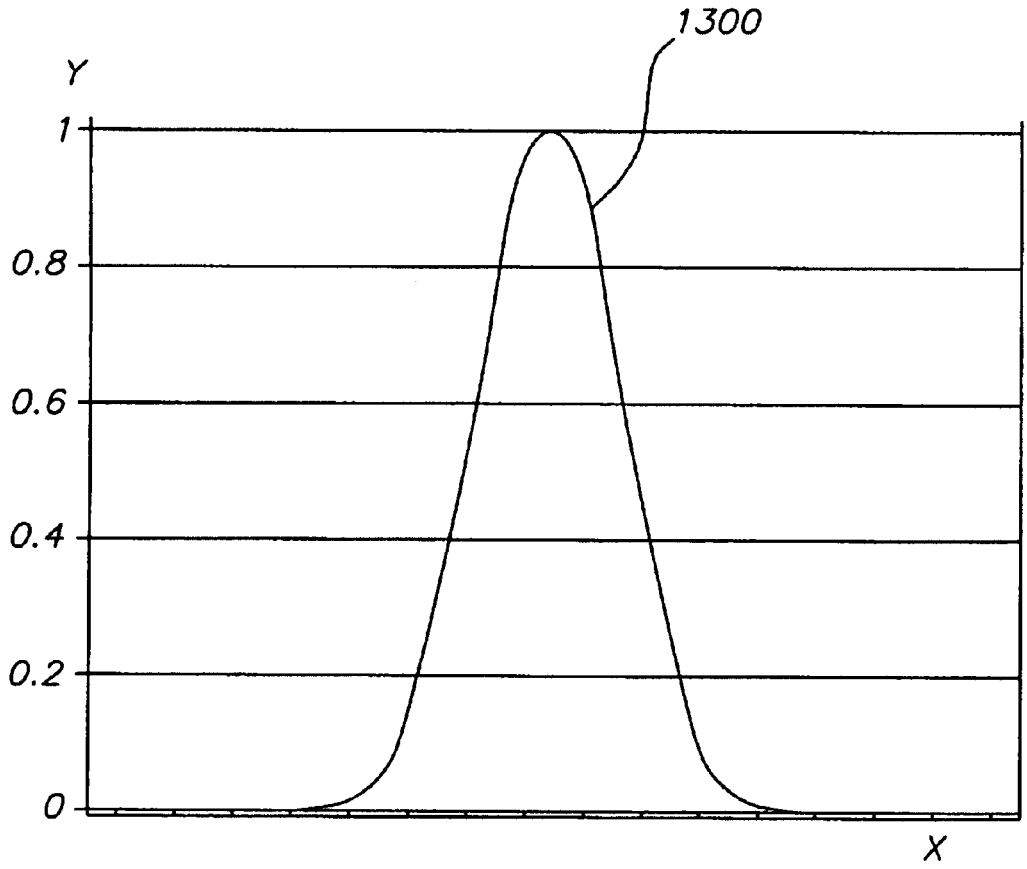
FIGS. 13A–B illustrate filter plots for a radar and IR sensor, respectively.
Figure 13B:
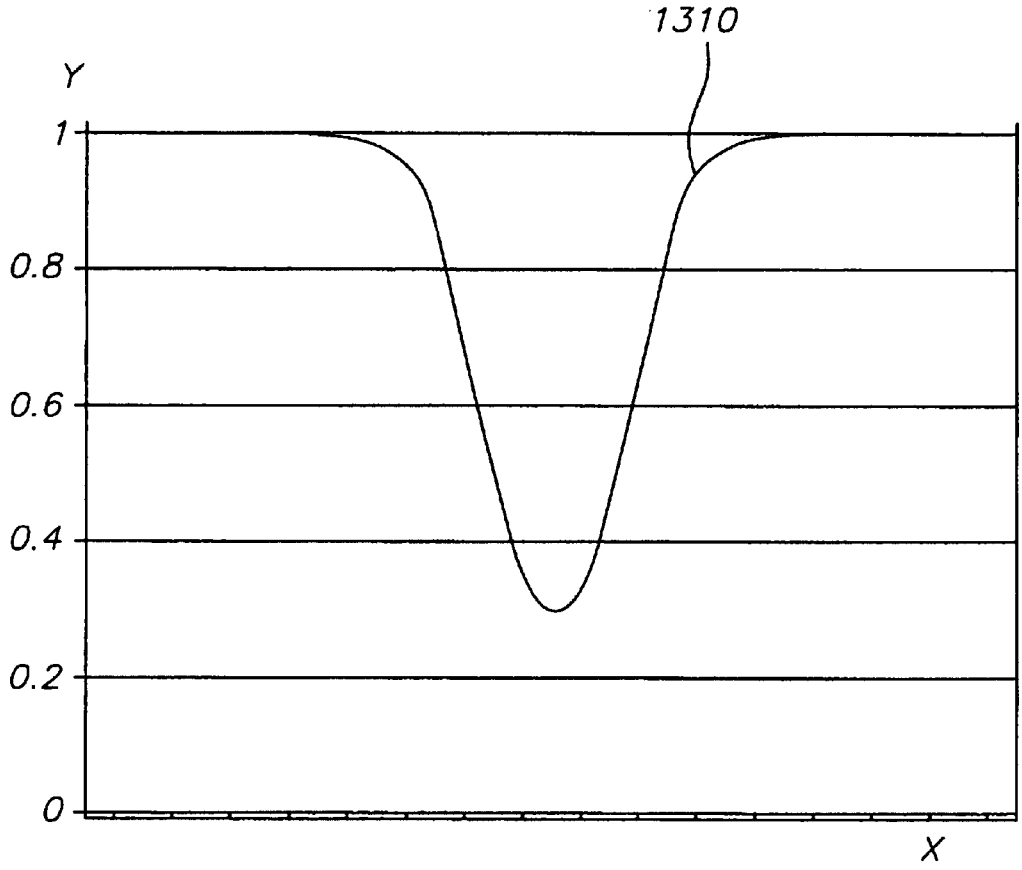

More detailed examples of such weighting functions are illustrated in FIGS. 13A–B. FIGS. 13A–B illustrate plots 1300, 1310 of example filter transparency distributions for respective radar and IR sensors. In each plot 1300, 1310, the horizontal or "x" axis represents a line or cross-section along the corresponding image. The vertical axis or "y" axis represents filter transparency or transmission capabilities.

Referring to FIG. 13A, the filter plot 1300 illustrates the filter weighting as a function of vertical position in the corresponding FIG. 13C. The plot illustrates transmission values, percentages, or ratios: 0.0 (no data transmitted), 0.2, 0.4 . . . 1.0 (all data transmitted). Thus, this example filter is designed to de-emphasize the least effective portions of the radar image, i.e., above the radar horizon 1320 and in the near field 1324. As a result, a filter with a high transmission ratio (i.e., 1.0) is applied to the most effective portion of the radar image, i.e., in the far field or the middle section of the image 1322.

Specifically, one example of a radar filter is configured with full-contrast cycle: 100% transparency at its maximum, in the center of the image and 0% at the upper and lower edges of the image. The example filter 1300 is constructed with a standard deviation of 50 pixels. Different filter configurations and functions can be utilized depending on the sensor used and the desired filtering effect.

FIG. 13B illustrates the filtering weighting as a function of vertical position in the corresponding FIG. 13D. This filter 1310 is designed to de-emphasize the least effective portions of the IR filter, i.e., the central image or far-field band, 1332 and emphasize the stronger regions 1330, 1334. The example IR filter has 75% maximum contrast: it varies from about 25% transparency in the center of the image, to 100% at the upper and lower edges, and has a standard deviation of 50 pixels similar to filter function 1300.

Weighting sensor images in this manner essentially pre-selects image regions that contain useful and relevant information, and are therefore candidates for inclusion in the fused image. In addition, by filtering out regions where little information is available, processing time can be reduced.

The pre-selection or filtering of image regions is further illustrated in FIGS. 14A–F, continuing with the example of radar and IR images.

Figures 14A, 14B, 14C, 14D, 14E, 14F:
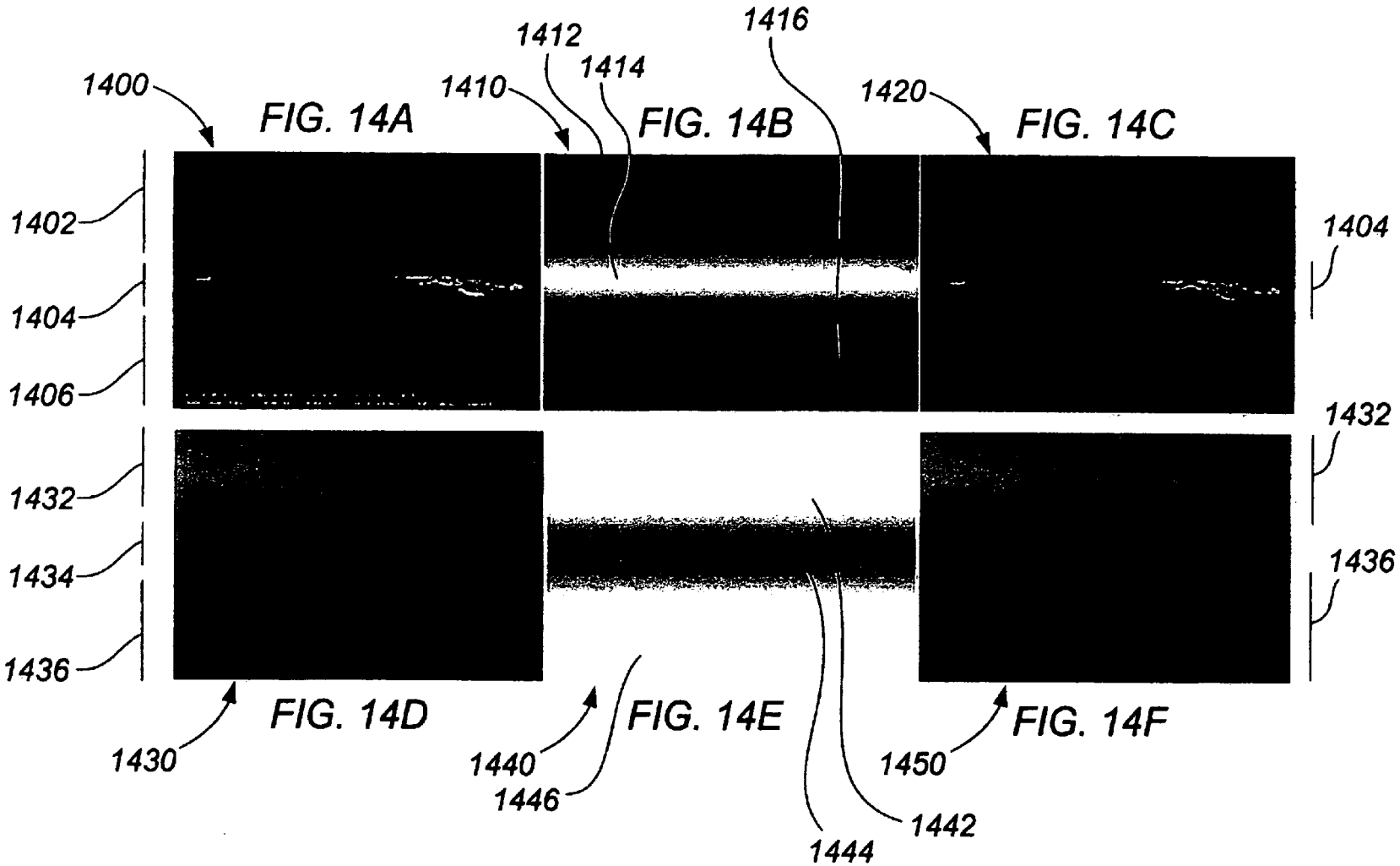
FIGS. 14A–F are black and white photographs illustrating radar and IR images, the filter function or effect, and the filter function applied to the radar and IR images.

FIG. 14A illustrates an original radar image 1400 generated by a radar sensor. As can be seen in image 1400, the middle region 1404 or far field contains the most information compared to regions 1402 (above the radar horizon) and 1406 (near field). FIG. 14B illustrates the filter 1410. The filter includes a high transmission section 1414 corresponding to region 1404 of the radar image, and low transmission sections 1412 and 1416 corresponding with regions 1402 and 1406 of the radar image. Thus, the filter de-emphasizes regions 1402, 1406 in which radar is least effective. FIG. 14C illustrates the post-filter radar image 1420 in which the farfield or middle region 1404 is emphasized to provide the most relevant information.

Similarly, FIG. 14D illustrates an original IR image 1430 generated by an IR sensor. As can be seen from the image 1430, the top and bottom regions 1432 (above radar horizon) and 1436 (near field) contain the most information compared to region 1434 (far field). FIG. 14E illustrates a filter 1440. The filter includes high transmission section 1442 and 1446 corresponding to regions 1432 and 1436 of the IR image, and low transmission section 1444 corresponding with region 1434 of the IR image. Thus, the filter de-emphasizes region 1434 in which IR is least effective. FIG. 14F illustrates the post-filter IR image 1450 in which the above radar horizon region 1432 and near field region 1436 are emphasized to provide the most relevant information.

For optimal filtering, the weighting function should account for state or operating parameters depending on the needs and design of the specific system. For example, as illustrated in FIGS. 15A–E, in the case of aircraft, filtering can be a function of aircraft roll or other motions or orientations that result in a rotation of the scene horizon. Thus, filtering can be matched by the orientation of the weighting function. Further, filtering can be a function of aircraft pitch and altitude, both of which affect the effective radar field of view and typically affect the standard deviation and vertical position of the weighting function.

Figures 15A, 15B, 15C, 15D, 15E:
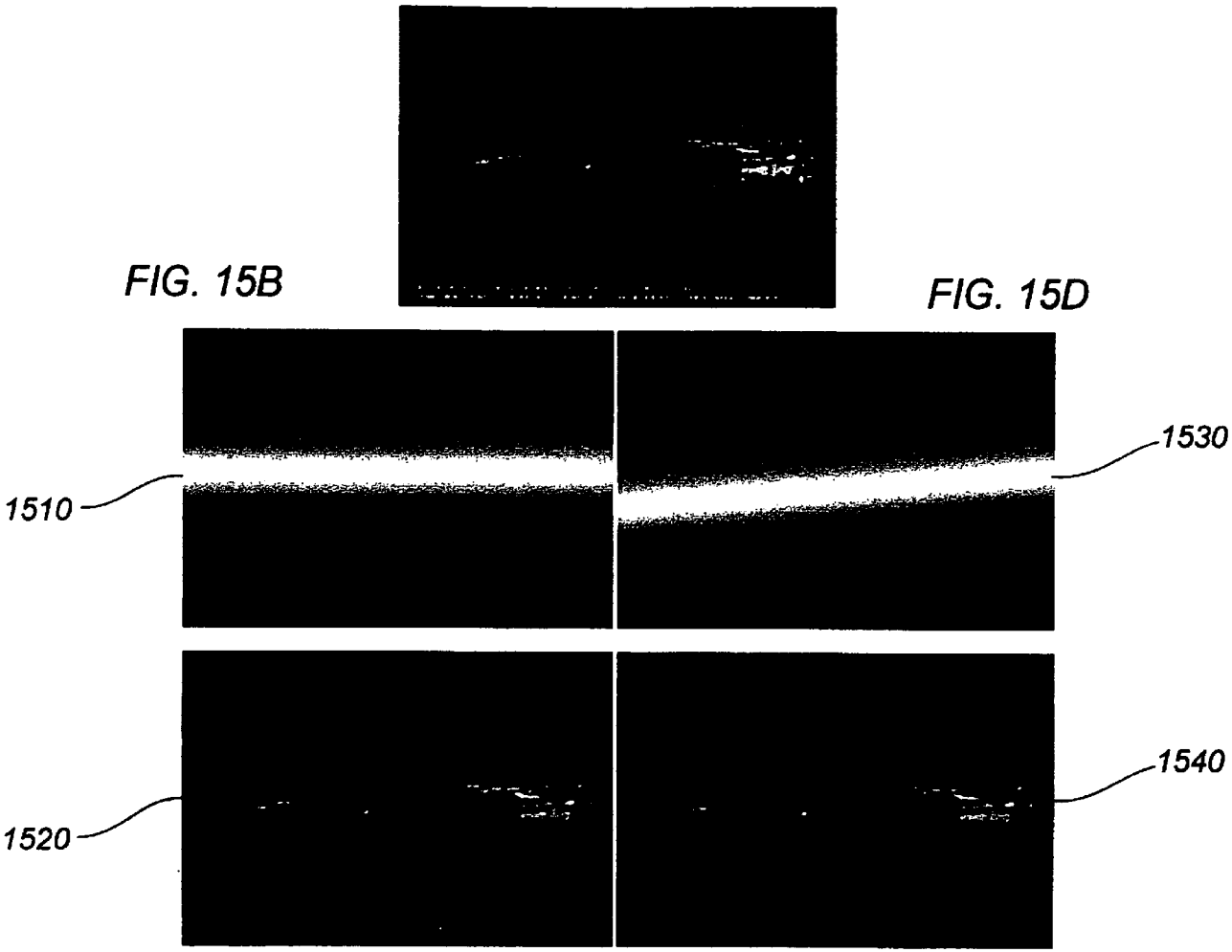
FIGS. 15A–E are black and white photographs illustrating a comparison of weighting functions with and without a roll effect.

Thus, for example, FIG. 15A illustrates an original radar image 1500. FIG. 15B illustrates a weighting or filter function 1510 for normal conditions, i.e., without aircraft roll. FIG. 15C illustrates the post-filter radar image 1520. As a result, both the filter 1510 and filtered radar image 1520 are parallel to the scene horizon and do not exhibit any angular adjustments.

FIG. 15D illustrates a weighting or filter function 1530 reflecting an aircraft roll of about 5 degrees. More specifically, the transmissive portion of the filter is rotated about 5 degrees. FIG. 16E illustrates the post-filter radar image 1540 reflecting the filter function being rotated about 5 degrees to account for an aircraft roll of about 5 degrees.

Combination of Pre-Filtering, Contrast-Based Image Fusion, and Luminance Correction Depending on the sensors and resulting quality of sensor and fused images, the spatial pre-filtering and/or luminance correction processes can be applied to images as part of the image fusion processing.

If only contrast-based image fusion and luminance correction are performed, they will usually be completed in the recited order. If all three processes are performed, spatial pre-filtering will typically be performed first, then contrast-based sensor fusion, and finally luminance correction. These sequences typically result in more effective fused images while reducing processing time. Luminance correction should normally follow both pre-filtering and contrast-based fusion to most closely achieve the desired luminance distribution and to prevent image luminance distribution from changing as a result of subsequent processing. By applying these techniques in this manner, system performance is enhanced by minimizing pipeline delays and data latency. These enhancements can be particularly useful in time-intensive situations that involve the images, e.g., airborne, pilot-in-the-loop applications, or other applications that use real-time image processing.

Although references have been made in the foregoing description to a preferred embodiment, persons of ordinary skill in the art of designing image processing systems will recognize that insubstantial modifications, alterations, and substitutions can be made to the preferred embodiment described without departing from the invention as claimed in the accompanying claims.

Thus, while the preferred embodiment is primarily described as processing two images from radar and IR sensors in connection with an aircraft, those skilled in the art will recognize that images from other types, combinations, and numbers of sensors can be utilized. For example, instead of two sensors, the system can be implemented with three, four, five, or other numbers of sensors. Moreover, instead of a radar and an IR sensor, the system can process images from the same type of sensors at different wavelengths, ultraviolet (UV) sensors, sensors based on an active or passive radio-frequency (RF) system; an ultrasonic sensor, a visible band sensor, e.g., a low-light level visible band sensor, Charge Coupled Device (CCD), or a color or gray-scale camera. Moreover, persons of ordinary skill in the art will appreciate that the present image fusion system and method can be used in other applications besides processing aircraft images. For example, the system and method can be used in connection with other moving vehicles, medical procedures, surveillance, and other monitoring and image processing applications involving multiple images or sensors. Additionally, persons of ordinary skill in the art will recognize that a fused or processed image can be formed based on various selection criteria or processes, greater or maximum contrast values being example criteria.

What is claimed is:

1. A method of forming a processed image using a plurality of images, each image generated by a respective sensor, comprising:

dividing each image into a plurality of image regions;

generating a contrast map for each image, each contrast map including a contrast value for each image region;

applying a selection process to said contrast value for selecting an image region for use in said processed image; and forming said processed image with the selected image regions, wherein contrast values of contrast maps of respective first, second, and third sensors are compared together to form said processed image, the method further comprising:

identifying contrast values from first and second sensor images to form an intermediate contrast map;

wherein applying the selection process comprises applying a selection process to the contrast values of the intermediate contrast map and contrast values of a contrast map of a third sensor image.

2. The method of claim 1, wherein dividing the images into the plurality of image regions further comprises dividing each image on a pixel-by-pixel basis, into blocks of pixels, or into arbitrary shaped regions.

3. The method of claim 1, wherein each sensor detects a different wavelength.

4. The method of claim 1, wherein the plurality of sensors includes an infrared (IR) sensor and a radar sensor.

5. The method of claim 1, wherein the plurality of sensors includes an infrared (IF) and an ultraviolet (UV) sensor.

6. The method of claim 1, wherein the plurality of sensors includes a radar sensor and an ultraviolet (UV) sensor.

7. The method of claim 1, wherein the plurality of images are generated by two or more infrared (IR) sensors, each IR sensor detecting a different wavelength.

8. The method of claim 1, wherein applying the selection process includes comparing competing contrast values of two corresponding image regions from two respective images.

9. The method of claim 8, wherein said selection process operates to select the greater of the competing contrast values.

10. The method of claim 8, wherein comparing competing contrast values further comprises comparing corresponding contrast values of overlapping image regions.

11. The method of claim 1, wherein the first and second sensors are infrared (IR) sensors and the third sensor is a radar sensor.

12. The method of claim 1, wherein a sensor image displays a view from a moving vehicle.

13. The method of claim 12, wherein the moving vehicle is an aircraft, a watercraft, an automobile, or a train.

14. The method of claim 1, further comprising adjusting an intensity of one or more regions of said processed image.

15. The method of claim 14, further comprising weighting the degree of intensity adjustment.

16. The method of claim 14, wherein adjusting the intensity further comprises adjusting the intensity across said processed image.

17. The method of claim 14, wherein adjusting the intensity across said processed image further comprises:

selecting one sensor as a reference sensor;

determining at least one average intensity value for each region of the reference sensor image; and adjusting the intensity of one or more regions in said processed image by combining the determined average intensity values and intensity values of said processed image.

18. The method of claim 17, wherein the sensors include a radar sensor and an infrared (IR) sensor, and wherein the reference sensor comprises the radar sensor.

19. The method of claim 17, wherein the sensors include a radar sensor and an infrared (IR) sensor, and wherein the reference sensor comprises the infrared (IR) sensor.

20. The method of claim 17, wherein adjusting the intensity of one or more regions in said processed image further comprises adjusting the intensity of a line in said processed image corresponding to a line in the reference sensor image for which the average intensity was determined.

21. The method of claim 20, wherein adjusting the intensity of one or more lines in said processed image further comprises adjusting the intensity of a line in said processed image that is adjacent to a line in said processed image corresponding to the same line in the reference sensor image for which the average intensity was determined.

22. The method of claim 1, before generating the contrast map for each image, further comprising filtering regions of one or more images.

23. The method of claim 22, wherein filtering further comprises spatially filtering regions of each image by weighting selected image regions.

24. The method of claim 23, wherein one sensor comprises a radar sensor, and wherein spatial filtering is performed by filtering image regions above a radar horizon.

25. The method of claim 1, wherein each of the sensors detects substantially the same scene such that each of the images is associated with substantially the same scene.

26. The method of claim 25, wherein each of the sensors detects a range of wavelengths that is different than a range of wavelengths detected by the other sensors, such that each of the images is associated with a different range of wavelengths.

27. A method of forming a processed image using a plurality of images, each image generated by a respective sensor, comprising:

dividing each image into a plurality of image regions;

generating a contrast map for each image, each contrast map including a contrast value for each image region;

applying a selection process to said contrast value for selecting an image region for use in said processed image; and forming said processed image with the selected image regions;

wherein generating the contrast map further comprises performing a convolution to determine the contrast value of the contrast map;

wherein performing the convolution further comprises performing the convolution with a Kernel Kc, wherein [{Kc*S1(x,y), Kc*S2(x,y)}] represents the convolution;

$$K_c = \begin{vmatrix} -\frac{1}{2\sqrt{2}} & -\frac{1}{2} & -\frac{1}{2\sqrt{2}} \\ -\frac{1}{2} & 2\frac{1+\sqrt{2}}{\sqrt{2}} & -\frac{1}{2} \\ -\frac{1}{2\sqrt{2}} & -\frac{1}{2} & -\frac{1}{2\sqrt{2}} \end{vmatrix} \cong \begin{vmatrix} -0.354 & -0.500 & -0.354 \\ -0.500 & 3.414 & -0.500 \\ -0.354 & -0.500 & -0.354 \end{vmatrix}$$

S1 represents image regions of a first image;

S2 represents image regions of a second image; and (x,y) represent spatial coordinates of the images.

28. The method of claim 27, wherein dividing the images into the plurality of image regions further comprises dividing each image on a pixel-by-pixel basis, into blocks of pixels, or into arbitrary shaped regions.

29. The method of claim 27, wherein each sensor detects a different wavelength.

30. The method of claim 27, wherein applying the selection process includes comparing competing contrast values of two corresponding image regions from two respective images.

31. The method of claim 30, wherein said selection process operates to select the greater of the competing contrast values.

32. The method of claim 30, wherein comparing competing contrast values further comprises comparing corresponding contrast values of overlapping image regions.

33. A system for combining a plurality of images to form a final image, comprising:

a plurality of sensors that generate respective images;

a processor configured to divide each image into a plurality of image regions, generate a contrast map for each image, each contrast map including a contrast value for each image region, apply a selection criterion to said contrast value for selecting an image region for use in said processed image, and form said processed image with the selected image regions;

wherein contrast values of contrast maps of a respective first, second, and third sensors are compared together to form the final image;

wherein the processor is further configured to identify contrast values from first and second sensor images to form an intermediate contrast map; and wherein the processor applies the selection criterion by applying a selection process to the contrast values of the intermediate contrast map and contrast values of a contrast map of a third sensor image.

34. The system of claim 33, wherein the processor is configured to divide each image into individual pixels, into blocks of pixels, or into arbitrary shaped regions.

35. The system of claim 33, wherein each sensor detects a different wavelength.

36. The system of claim 33, wherein the plurality of sensors includes an infrared (IR) sensor and a radar sensor.

37. The system of claim 33, wherein the plurality of sensors includes an infrared (IR) and an ultraviolet (UV) sensor.

38. The system of claim 33, wherein the plurality of sensors includes a radar sensor and an ultraviolet (UV) sensor.

39. The system of claim 33, wherein the plurality of sensors includes two or more infrared (IR) sensors, each IR sensor detecting a different wavelength.

40. The system of claim 33, wherein the processor is further configured to compare competing contrast values of two corresponding image regions from two respective images.

41. The system of claim 40, wherein the processor is further configured to select the greater of the competing contrast values.

42. The system of claim 40, wherein the processor is configured to compare corresponding contrast values of overlapping image regions.

43. The system of claim 33, wherein the first and second sensors are infrared (IR) sensors and the third sensor is a radar sensor.

44. The system of claim 33, wherein a sensor image displays a view from a moving vehicle.

45. The system of claim 44, wherein the moving vehicle comprises an aircraft, a watercraft, an automobile, or a train.

46. The system of claim 33, wherein the processor is further configured to adjust an intensity of one or more regions of said processed image.

47. The system of claim 46, wherein the processor is configured to adjust the intensity across said processed image.

48. The system of claim 47, wherein the processor is configured to weight the degree of intensity adjustment.

49. The system of claim 47, wherein the processor is further configured to select one sensor as a reference sensor, determine at least one average intensity value for each region of the reference sensor image across the reference sensor image, and adjust the intensity of one or more regions in said processed image by combining the determined average intensity values and intensity values of said processed image.

50. The system of claim 49, wherein the sensors include a radar sensor and an infrared (IR) sensor, and wherein the reference sensor comprises the radar sensor.

51. The system of claim 49, wherein the sensors include a radar sensor and an infrared (IR) sensor, and wherein the reference sensor comprises the infrared (IR) sensor.

52. The system of claim 49, wherein the processor is configured to adjust the intensity of a line in said processed image corresponding to a line in the reference sensor image for which the average intensity was determined.

53. The system of claim 49, wherein the processor is configured to adjust the intensity of a line in said processed image that is adjacent to a line in said processed image corresponding to the same line in the reference sensor image for which the average intensity was determined.

54. The system of claim 33, wherein the processor is configured to filter one or more image regions.

55. The system of claim 54, wherein the processor is configured to filter the one or more image regions by weighting selected image regions.

56. The system of claim 54, wherein one sensor comprises a radar sensor, and wherein the processor is further configured to spatially filter image regions above a radar horizon.

57. The system of claim 33, wherein each of the sensors detects substantially the same scene such that each of the respective images is associated with substantially the same scene.

58. The system of claim 33, wherein each of the sensors detects a range of wavelengths that is different than a range of wavelengths detected the other sensors, such that each of the respective images is associated with a different range of wavelengths.

59. A system for combining a plurality of images to form a final image, comprising:

a plurality of sensors that generate respective images; and a processor configured to divide each image into a plurality of image regions, generate a contrast map for each image, each contrast map including a contrast value for each image region, apply a selection criterion to said contrast value for selecting an image region for use in said processed image, and form said processed image with the selected image regions;

wherein the processor is configured to generate the contrast map by performing a convolution to determine the contrast value of the contrast map; and wherein the processor is configured to perform the convolution with a Kernel Kc, wherein [{Kc*S1(x,y), Kc*S2(x,y)}] represents the convolution;

$$K_c = \begin{vmatrix} -\frac{1}{2\sqrt{2}} & -\frac{1}{2} & -\frac{1}{2\sqrt{2}} \\ -\frac{1}{2} & 2\frac{1+\sqrt{2}}{\sqrt{2}} & -\frac{1}{2} \\ -\frac{1}{2\sqrt{2}} & -\frac{1}{2} & -\frac{1}{2\sqrt{2}} \end{vmatrix} \cong \begin{vmatrix} -0.354 & -0.500 & -0.354 \\ -0.500 & 3.414 & -0.500 \\ -0.354 & -0.500 & -0.354 \end{vmatrix}$$

S1 represents image regions of a first image;

S2 represents image regions of a second image; and (x,y) represent spatial coordinates of the images.

60. The system of claim 59, wherein the processor is configured to divide each image into individual pixels, into blocks of pixels, or into arbitrary shaped regions.

61. The system of claim 59, wherein each sensor detects a different wavelength.

62. The system of claim 59, wherein the processor is further configured to compare competing contrast values of two corresponding image regions from two respective images.

63. The system of claim 62, wherein the processor is further configured to select the greater of the competing contrast values.

64. The system of claim 62, wherein the processor is configured to compare corresponding contrast values of overlapping image regions.

*65. A method of forming a processed image using a plurality of images, each image generated by a respective sensor, comprising:*

*dividing each image into a plurality of image regions;*

*generating a contrast map for each image, each contrast map including a contrast value for each image region;*

*applying a selection process to said contrast value for selecting an image region for use in said processed image; and*

*forming said processed image with the selected image regions*

*wherein dividing the images into the plurality of image regions further comprises dividing each image on a pixel-by-pixel basis, into blocks of pixels, or into arbitrary shaped regions, and*

*wherein applying the selection process includes comparing competing contrast values of corresponding image regions from respective images.*

*66. The method of claim 65, wherein:*

*each sensor detects a range of wavelengths that is different than a range of wavelengths detected by the other sensors such that each of the images is associated with a different range of wavelengths;*

*dividing each image comprises defining sets of corresponding image regions by dividing each image into a plurality of image regions each of which is substantially aligned with and substantially overlaps with one image region in each of the other images; and*

*selecting an image region for use in the processed image comprises comparing, for each set of corresponding image regions, the contrast values for each image region in the set and selecting one image region from the set based on the comparing.*

*67. The method of claim 65, wherein the sensors are fixed to a moving vehicle, wherein each sensor detects substantially the same field of view from the moving vehicle such that the images represent substantially the same field of view.*

*68. The method of claim 65, wherein the plurality of sensors includes at least two of an infrared sensor, an ultraviolet sensor, and a radio frequency sensor.*

*69. The method of claim 68, wherein the radio frequency sensor comprises an imaging radar sensor.*

*70. The method of claim 65, wherein each sensor is one of an infrared sensor, an ultraviolet sensor, or a radio frequency sensor.*

*71. The method of claim 65, wherein each sensor detects a range of wavelengths that is different than a range of wavelengths detected by the other sensors.*

*72. The method of claim 65, comprising adjusting an intensity value associated with at least one region of the processed image based on an average intensity value associated with at least a portion of one of the processed image.*

*73. The method of claim 72, wherein adjusting the intensity value further comprises adjusting the intensity value across said processed image.*

*74. The method of claim 73, wherein adjusting the intensity value across said processed image further comprises:*

*selecting one sensor as a reference sensor;*

*determining an average intensity value of each region of the reference sensor image; and*

*adjusting the intensity value of one or more regions in said processed image by combining the determined average intensity values and intensity values of said processed image.*

*75. The method of claim 74, wherein adjusting the intensity value of one or more regions in said processed image further comprises adjusting the intensity value of a line in said processed image corresponding to a line in the reference sensor image for which the average intensity value was determined.*

*76. The method of claim 75, wherein adjusting the intensity value of one or more lines in said processed image further comprises adjusting the intensity value of a line in said processed image that is adjacent to a line in said processed image corresponding to the same line in the reference sensor image for which the average intensity value was determined.*

*77. The method of claim 74, wherein a scene horizon is repositioned at an angle relative to an image horizon, further comprising:*

*determining an average intensity value of the reference sensor image on a pixel-by-pixel basis; and*

*adjusting the intensity value of said processed image on a pixel-by-pixel basis.*

*78. The method of claim 77, wherein the scene horizon is repositioned due to roll, bank, yaw or pitch motions.*

*79. The method of claim 65, comprising filtering regions of one or more images before generating the contrast map for each image.*

*80. The method of claim 79, wherein filtering comprises spatially filtering regions of each image by weighting selected image regions.*

*81. The method of claim 80, wherein one sensor comprises a radar sensor, and wherein spatial filtering is performed by filtering image regions above a radar horizon.*

*82. The method of claim 65, wherein generating the contrast map further comprises performing a convolution to determine the contrast value of the contrast map.*

*83. The method of claim 65, wherein said selection process operates to select the greater of the competing contrast values.*

*84. The method of claim 65, wherein comparing competing contrast values further comprises comparing corresponding contrast values of overlapping image regions.*

*85. The method of claim 65, wherein a sensor image displays a view from a moving vehicle.*

*86. The method of claim 85, wherein the moving vehicle is an aircraft, a watercraft, an automobile, or a train.*

*87. A method of forming a processed image using a plurality of images, each image generated by a respective sensor to form a processed image, comprising:*

*filtering portions of one or more images;*

*comparing contrast values of the images by*

*dividing each image into a plurality of image regions,*

*generating a contrast map for each image, each contrast map including contrast values for each image region of each image;*

*comparing contrast values in each contrast map of the image regions,*

*identifying maximum contrast values based on the comparison of contrast values, and*

*selecting image regions corresponding to the maximum contrast values,*

*forming the processed image with the selected image regions; and*

*adjusting an intensity of one or more portions of the processed image by selecting one sensor as a reference sensor,*

*determining at least one average intensity value for one or more regions of the reference sensor image across the reference sensor image, and*

*adjusting the intensity of one or more regions in the processed image by combining the determined average intensity values and intensity values of the processed image;*

*wherein generating the contrast map further comprises performing a convolution to determine the contrast value of the contrast map.*

*88. The method of claim 87, wherein performing the convolution comprises performing a convolution over two image regions that are spatially pre-registered or aligned.*

*89. The method of claim 87, wherein performing the convolution comprises using a kernel including values that reflect a distance metric from a center position.*

*90. The method of claim 87, wherein the plurality of sensors includes at least two of an infrared sensor, an ultraviolet sensor, and a radio frequency sensor.*

*91. The method of claim 90, wherein the radio frequency sensor comprises an imaging radar sensor.*

*92. The method of claim 87, wherein each sensor detects a range of wavelengths that is different than a range of wavelengths detected by the other sensors.*

*93. The method of claim 87, wherein applying the selection process includes comparing competing contrast values of two corresponding image regions from two respective images.*

*94. The method of claim 87, wherein each sensor is one of an infrared sensor, an ultraviolet sensor, or a radio frequency sensor.*

*95. The method of claim 94, wherein the radio frequency sensor comprises an imaging radar sensor.*

*96. The method of claim 87, wherein each sensor detects a range of wavelengths that is different than a range of wavelengths detected by the other sensors.*

*97. The method of claim 87, wherein selecting image regions includes comparing competing contrast values of two corresponding image regions from two respective images.*

*98. The method of claim 87, wherein filtering comprises spatially filtering regions of each image by weighting selected image regions.*

*99. The method of claim 98, wherein one sensor comprises a radar sensor, and wherein spatial filtering is performed by filtering image regions above a radar horizon.*

*100. A method of forming a processed image using a plurality of images, each image generated by a respective sensor, comprising:*

*comparing contrast values of contrast maps of the images by*

*defining a plurality of sets of corresponding image regions in the plurality of images;*

*generating contrast maps with contrast values for the sets of corresponding image regions in the plurality of images;*

*identifying, for each set of corresponding image regions, one contrast value as a maximum contrast value, and*

*selecting image regions corresponding to the maximum contrast values,*

*forming a processed image using the selected image regions; and*

*adjusting an intensity of at least one portion of the processed image by:*

*determining at least one intensity value for the at least one portion of the processed image,*

*selecting one of the sensors as a reference sensor,*

*determining an average intensity value for one or more regions of an image generated by the reference sensor, and*

*adjusting the at least one intensity value for the at least one portion of the processed image in accordance with the determined average intensity value.*

*101. A system for combining a plurality of images to form a final image, comprising:*

*a plurality of sensors that generate respective images;*

*a processor configured to*

*divide each image into a plurality of image regions,*

*generate a contrast map for each image, each contrast map including a contrast value for each image region,*

*apply a selection criterion to said contrast value for selecting an image region for use in said processed image, and*

*form said processed image with the selected image regions;*

*wherein the processor is further configured to divide the images into the plurality of image regions by dividing each image on a pixel-by-pixel basis, into blocks of pixels, or into arbitrary shaped regions, and*

*wherein the process is further configured to apply the selection process by comparing competing contrast values of corresponding image regions from respective images.*

*102. The system of claim 101, wherein each sensor detects a different wavelength.*

*103. The system of claim 101, wherein at least one sensor is of the following group: an infrared (IR) sensor, a radar sensor, and an ultraviolet (UV) sensor.*

*104. The system of claim 101, wherein the processor is further configured to compare competing contrast values of two corresponding image regions from two respective images.*

*105. The system of claim 101, wherein the processor is further configured to select the greater of the competing contrast values.*

*106. The system of claim 101, wherein the processor is configured to compare corresponding contrast values of overlapping image regions.*

*107. The system of claim 101, wherein a sensor image displays a view from a moving vehicle.*

*108. The system of claim 107, wherein the moving vehicle comprises an aircraft, a watercraft, an automobile, or a train.*

*109. The system of claim 101, wherein the processor is further configured to adjust an intensity of one or more regions of said processed image.*

*110. The system of claim 109, wherein the processor is configured to adjust the intensity across said processed image.*

*111. The system of claim 110, wherein the processor is configured to weight the degree of intensity adjustment.*

*112. The system of claim 110, wherein the processor is further configured to select one sensor as a reference sensor, determine at least one average intensity value for each region of the reference sensor image across the reference sensor image, and adjust the intensity of one or more regions in said processed image by combining the determined average intensity values and intensity values of said processed image.*

*113. The system of claim 112, wherein the processor is configured to adjust the intensity of a line in said processed image corresponding to a line in the reference sensor image for which the average intensity was determined.*

*114. The system of claim 112, wherein the processor is configured to adjust the intensity of a line in said processed image that is adjacent to a line in said processed image corresponding to the same line in the reference sensor image for which the average intensity was determined.*

*115. The system of claim 101, wherein the processor is configured to filter one or more image regions.*

*116. The system of claim 115, wherein the processor is configured to filter the one or more image regions by weighting selected image regions.*

*117. The system of claim 115, wherein one sensor comprises a radar sensor, and wherein the processor is further configured to spatially filter image regions above a radar horizon.*

*118. The system of claim 101, wherein the processor is configured to generate the contrast map by performing a convolution to determine the contrast value of the contrast map.*

*119. A system for forming a processed image using a plurality of images, comprising:*

*a first sensor that generates a first image;*

*a second sensor that generates a second image,*

*wherein the first and second images are divided into a plurality of image regions;*

*a processor configured to*

*filter one or more portions of one or more images;*

*compare contrast values of the images by*

*dividing each image into a plurality of image regions,*

*generating a contrast map for each image, each contrast map including contrast values for each image region of each image,*

*comparing contrast values in each contrast map of the image regions,*

*identifying maximum contrast values,*

*selecting image regions corresponding to the maximum contrast values, and*

*forming the processed image with the selected image regions; and*

*adjust an intensity of one or more regions of the final image by*

*selecting one sensor as a reference sensor,*

*determining at least one average intensity value for each region of the reference sensor image across the reference sensor image, and*

*adjusting the intensity of one or more regions in said processed image by combining the determined average intensity values and intensity values of the final image;*

*wherein the processor is further configured to divide the images into the plurality of image regions by dividing each image on a pixel-by-pixel basis, into blocks of pixels, or into arbitrary shaped regions, and*

*wherein the processor is further configured to apply the selection process by comparing competing contrast values of corresponding image regions from respective images.*

* * * * *

UNITED STATES PATENT AND TRADEMARK OFFICE

CERTIFICATE OF CORRECTION

PATENT NO. : RE41,447 E
APPLICATION NO. : 11/409545
DATED : July 20, 2010
INVENTOR(S) : Carlo Tiana It is certified that error appears in the above-identified patent and that said Letters Patent is hereby corrected as shown below:

In the Claims

Column 16, Claim 5, line 63 Delete "(IF)" Insert -- (IR) --

Signed and Sealed this
Eighth Day of February, 2011

David J. Kappos

David J. Kappos
*Director of the United States Patent and Trademark Office*